US012669922B2

(12) United States Patent
Maratta et al.

(10) Patent No.: US 12,669,922 B2
(45) Date of Patent: Jun. 30, 2026

(54) USER INTERFACES FOR LOGGING AND INTERACTING WITH EMOTIONAL VALENCE DATA

(71) Applicant: Apple Inc., Cupertino, CA (US)

(72) Inventors: Lindsey Maratta, Sunnyvale, CA (US); Dima Badawi, San Jose, CA (US); Jose Antonio Checa Oloriz, San Francisco, CA (US); Pablo F. Caro, San Francisco, CA (US); Marie E. Dommenget, San Francisco, CA (US); Bradley W. Griffin, Aptos, CA (US); James J. Owen, San Francisco, CA (US); Stacie R. Terhaar, Glendale, AZ (US); Niharika Bedekar, San Francisco, CA (US); Raphael A. Bernier, Seattle, WA (US); Jessica Ficklin, Encinitas, CA (US); Michael Pangburn, San Jose, CA (US)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 18/669,677

(22) Filed: May 21, 2024

(65) Prior Publication Data

US 2024/0402889 A1 Dec. 5, 2024

Related U.S. Application Data

(60) Provisional application No. 63/470,942, filed on Jun. 4, 2023.

(51) Int. Cl.
| *G06F 3/04842* | (2022.01) |
| *G06F 3/0487* | (2013.01) |
| *G06F 9/451* | (2018.01) |

(52) U.S. Cl.
CPC ........ *G06F 3/04842* (2013.01); *G06F 3/0487* (2013.01); *G06F 9/451* (2018.02)

(58) Field of Classification Search
CPC ..... G06F 3/04842; G06F 9/451; G06F 3/0487
See application file for complete search history.

(56) References Cited

U.S. PATENT DOCUMENTS

| 2004/0210117 | A1 | 10/2004 | Ueno et al. | |
| 2018/0239869 | A1* | 8/2018 | Laing | G16H 20/30 |
| 2019/0369845 | A1* | 12/2019 | Rucker | G06F 3/0486 |
| 2022/0066902 | A1 | 3/2022 | Narra et al. | |
| 2022/0223064 | A1* | 7/2022 | Chauhan | G06F 3/0482 |
| 2023/0128193 | A1* | 4/2023 | Williams | A61B 5/7455 |
| | | | | 715/711 |
| 2024/0149115 | A1* | 5/2024 | Yoon | A63B 71/0622 |
| 2024/0393934 | A1* | 11/2024 | Grassi | G06F 3/04847 |

FOREIGN PATENT DOCUMENTS

| JP | 2004-318503 | A | | 11/2004 |
| JP | 2017016704 | A | * | 1/2017 |

OTHER PUBLICATIONS

English translation of JP-2017016704-A (Year: 2017).*

(Continued)

*Primary Examiner* — Lixi C Simpson

(74) *Attorney, Agent, or Firm* — YHE Law LLP

(57) ABSTRACT

The present disclosure generally relates to techniques and user interfaces for logging and/or interacting with health information.

36 Claims, 27 Drawing Sheets

(56) References Cited

OTHER PUBLICATIONS https://www.youtube.com/watch?v=ytAtKU6yEUI (Year: 2020).*

International Preliminary Report on Patentability received for PCT Patent Application No. PCT/US2024/031452, mailed on Dec. 18, 2025, 13 pages.

Gnacek et al., "AVDOS—Affective Video Database Online Study Video database for affective research emotionally validated through an online survey", 2022 10th International Conference on Affective Computing and Intelligent Interaction (ACII), Available online at: XP034234048, DOI: 10.1109/ACII55700.2022.9953891, Oct. 18, 2022, pp. 1-8.

International Search Report and Written Opinion received for PCT Patent Application No. PCT/US2024/031452, mailed on Nov. 14, 2024, 19 pages.

Invitation to Pay Additional Fees and Partial International Search Report received for PCT Patent Application No. PCT/US2024/031452, mailed on Sep. 24, 2024, 11 pages.

* cited by examiner

Portable Multifunction Device 100

210

212

208

206

200

Speaker 111

Optical Sensor 164

Proximity Sensor 166

210 is SIM card slot
212 is headphone jack

202

Touch Screen 112

Contact Intensity Sensor(s) 165

Tactile Output Generator(s) 167

203

Microphone 113

Home 204

Accelerometer(s) 168

External Port 124

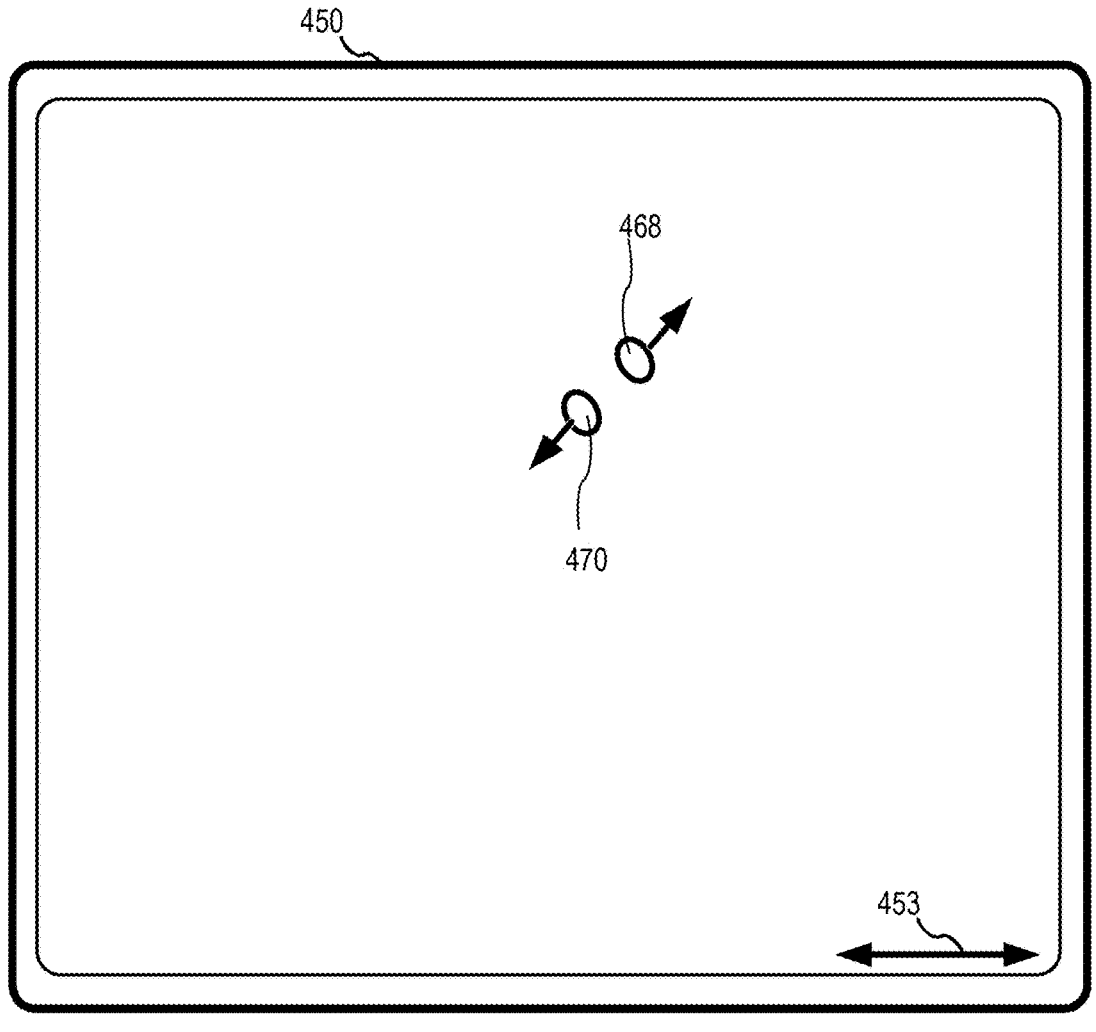
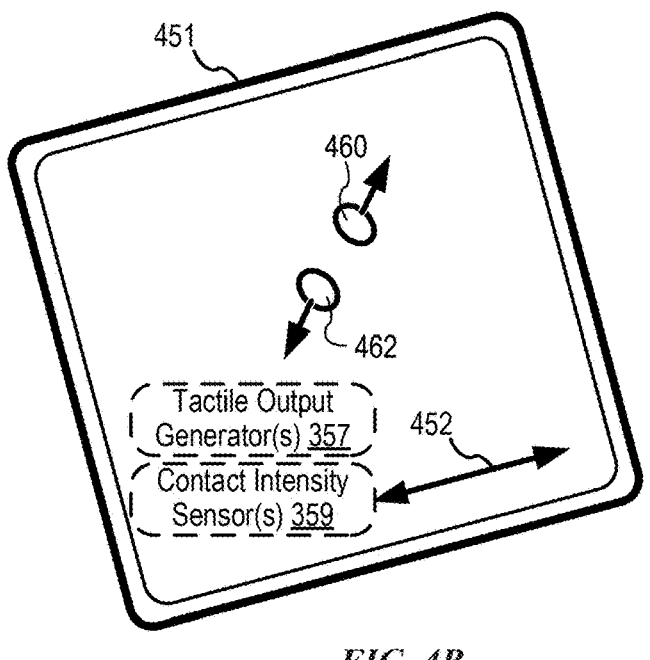
*FIG. 4B*

DEVICE
500

504

508

502

506

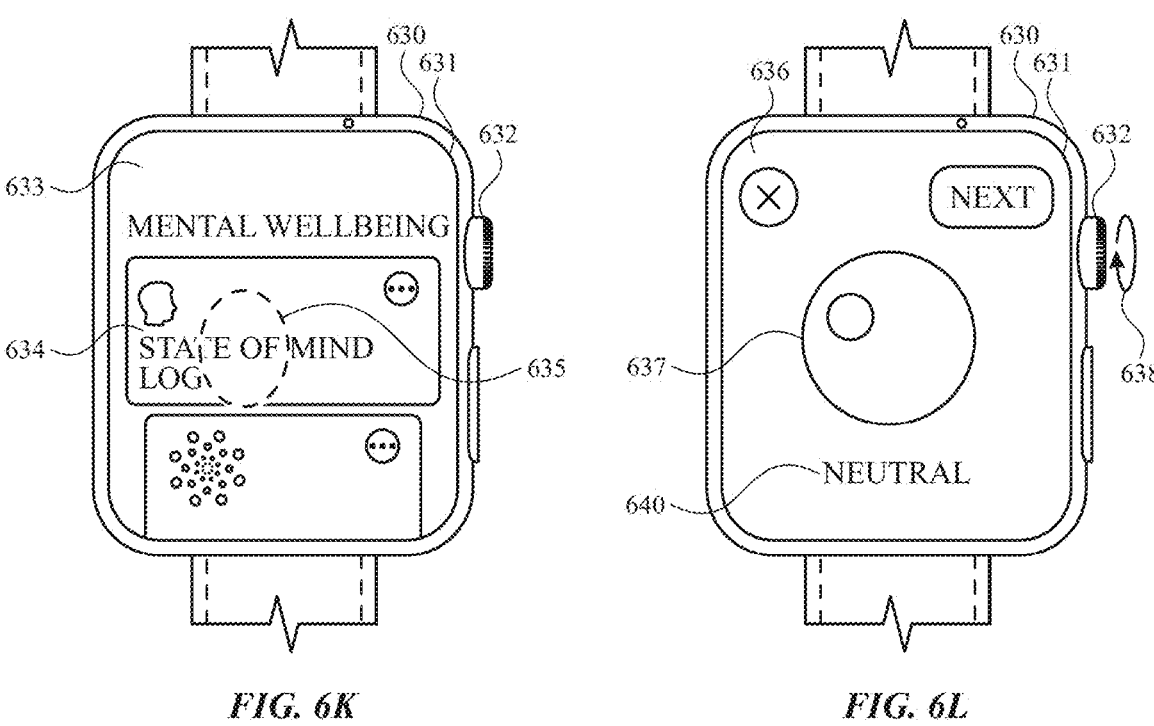
*FIG. 6K*                  *FIG. 6L*
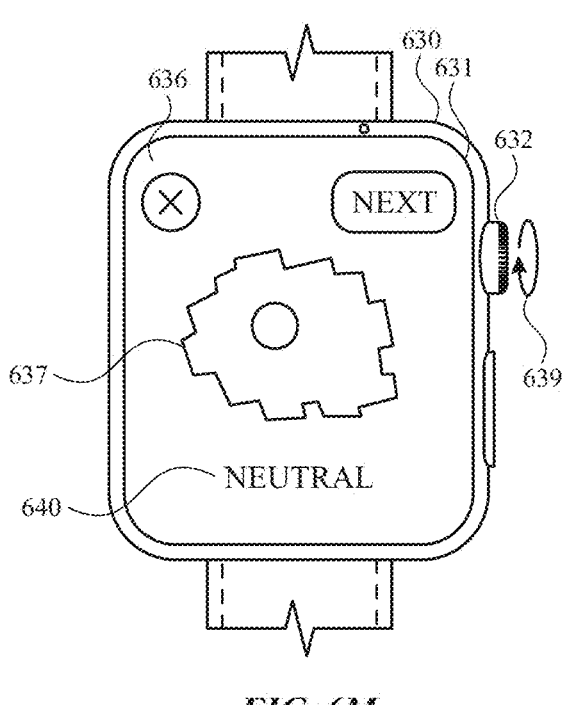
*FIG. 6M*

700

```
┌─────────────────────────────────────────────────────────────┐
│  DISPLAYING, VIA THE DISPLAY GENERATION COMPONENT, A        │
│  FIRST USER INTERFACE FOR LOGGING EMOTIONAL VALENCE         │
│  DATA, THE FIRST USER INTERFACE INCLUDING: A SHAPE HAVING   │
│  A FIRST APPEARANCE REPRESENTING A FIRST EMOTIONAL          │─── 702
│  VALENCE VALUE AND FIRST TEXT DESCRIBING A FIRST RANGE OF   │
│  EMOTIONAL VALENCE VALUES, WHEREIN THE FIRST RANGE OF       │
│  EMOTIONAL VALENCE VALUES INCLUDES THE FIRST EMOTIONAL      │
│  VALENCE VALUE                                              │
└─────────────────────────────────────────────────────────────┘
```

```
┌─────────────────────────────────────────────────────────────┐
│  WHILE DISPLAYING THE FIRST USER INTERFACE FOR LOGGING      │
│  EMOTIONAL VALENCE DATA, DETECTING, VIA THE ONE OR MORE     │─── 704
│  INPUT DEVICES, A FIRST USER INPUT THAT REQUESTS TO CHANGE  │
│  THE FIRST EMOTIONAL VALENCE VALUE                          │
└─────────────────────────────────────────────────────────────┘
```

```
┌─────────────────────────────────────────────────────────────┐
│  IN RESPONSE TO DETECTING THE FIRST USER INPUT, UPDATING    │─── 706
│  THE DISPLAY OF THE FIRST USER INTERFACE, INCLUDING:        │
│  ┌───────────────────────────────────────────────────────┐ │
│  │  CHANGING THE SHAPE TO HAVE A SECOND APPEARANCE        │ │
│  │  DIFFERENT FROM THE FIRST APPEARANCE, WHEREIN THE      │ │
│  │  SECOND APPEARANCE REPRESENTS A SECOND EMOTIONAL       │─── 708
│  │  VALENCE VALUE DIFFERENT FROM THE FIRST EMOTIONAL      │ │
│  │  VALENCE VALUE                                         │ │
│  └───────────────────────────────────────────────────────┘ │
│  ┌───────────────────────────────────────────────────────┐ │
│  │  IN ACCORDANCE WITH A DETERMINATION THAT THE SECOND    │ │
│  │  EMOTIONAL VALENCE VALUE IS WITHIN A SECOND RANGE OF   │ │
│  │  EMOTIONAL VALENCE VALUES THAT DOES NOT OVERLAP        │ │
│  │  WITH THE FIRST RANGE OF EMOTIONAL VALENCE VALUES,     │─── 710
│  │  CHANGING THE FIRST TEXT TO SECOND TEXT DESCRIBING     │ │
│  │  THE SECOND RANGE OF EMOTIONAL VALENCE VALUES          │ │
│  └───────────────────────────────────────────────────────┘ │
│  ┌───────────────────────────────────────────────────────┐ │
│  │  IN ACCORDANCE WITH A DETERMINATION THAT THE SECOND    │ │
│  │  EMOTIONAL VALENCE VALUE IS WITHIN THE FIRST RANGE     │ │
│  │  OF EMOTIONAL VALENCE VALUES, FORGOING CHANGING        │─── 712
│  │  THE FIRST TEXT BASED ON THE FIRST USER INPUT          │ │
│  └───────────────────────────────────────────────────────┘ │
└─────────────────────────────────────────────────────────────┘
```

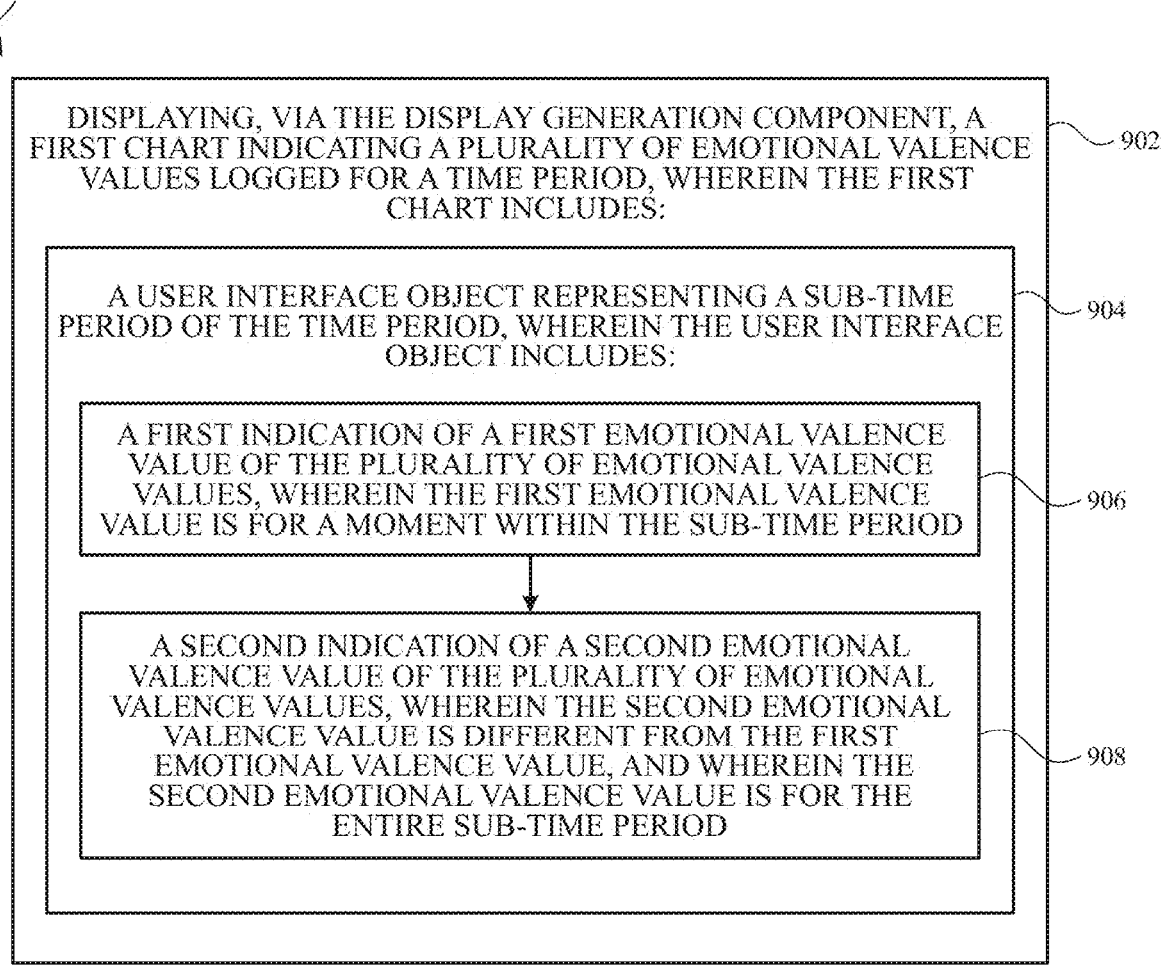

DISPLAYING, VIA THE DISPLAY GENERATION COMPONENT, A FIRST CHART INDICATING A PLURALITY OF EMOTIONAL VALENCE VALUES LOGGED FOR A TIME PERIOD, WHEREIN THE FIRST CHART INCLUDES: — 902

A USER INTERFACE OBJECT REPRESENTING A SUB-TIME PERIOD OF THE TIME PERIOD, WHEREIN THE USER INTERFACE OBJECT INCLUDES: — 904

A FIRST INDICATION OF A FIRST EMOTIONAL VALENCE VALUE OF THE PLURALITY OF EMOTIONAL VALENCE VALUES, WHEREIN THE FIRST EMOTIONAL VALENCE VALUE IS FOR A MOMENT WITHIN THE SUB-TIME PERIOD — 906

A SECOND INDICATION OF A SECOND EMOTIONAL VALENCE VALUE OF THE PLURALITY OF EMOTIONAL VALENCE VALUES, WHEREIN THE SECOND EMOTIONAL VALENCE VALUE IS DIFFERENT FROM THE FIRST EMOTIONAL VALENCE VALUE, AND WHEREIN THE SECOND EMOTIONAL VALENCE VALUE IS FOR THE ENTIRE SUB-TIME PERIOD — 908

*FIG. 9*

USER INTERFACES FOR LOGGING AND INTERACTING WITH EMOTIONAL VALENCE DATA

CROSS-REFERENCE TO RELATED APPLICATIONS

This application claims priority to U.S. Patent Application No. 63/470,942, entitled "USER INTERFACES FOR LOGGING AND INTERACTING WITH EMOTIONAL VALENCE DATA," filed on Jun. 4, 2023, the entire disclosure of which is hereby incorporated by reference.

FIELD

The present disclosure relates generally to computer user interfaces, and more specifically to techniques for logging and interacting with health data.

BACKGROUND

Some personal electronic devices allow users to view and log data corresponding to their mental well-being.

BRIEF SUMMARY

Some techniques for logging and interacting with emotional valence data using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for logging and interacting with emotional valence data. Such methods and interfaces optionally complement or replace other methods for logging and interacting with emotional valence data. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method is performed at a computer system that is in communication with a display generation component and one or more input devices. The method includes: displaying, via the display generation component, a first user interface for logging emotional valence data, the first user interface including: a shape having a first appearance representing a first emotional valence value; and first text describing a first range of emotional valence values, wherein the first range of emotional valence values includes the first emotional valence value; while displaying the first user interface for logging emotional valence data, detecting, via the one or more input devices, a first user input that requests to change the first emotional valence value; and in response to detecting the first user input, updating the display of the first user interface, including: changing the shape to have a second appearance different from the first appearance, wherein the second appearance represents a second emotional valence value different from the first emotional valence value; in accordance with a determination that the second emotional valence value is within a second range of emotional valence values that does not overlap with the first range of emotional valence values, changing the first text to second text describing the second range of emotional valence values; and in accordance with a determination that the second emotional valence value is within the first range of emotional valence values, forgoing changing the first text based on the first user input.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a first user interface for logging emotional valence data, the first user interface including: a shape having a first appearance representing a first emotional valence value; and first text describing a first range of emotional valence values, wherein the first range of emotional valence values includes the first emotional valence value; while displaying the first user interface for logging emotional valence data, detecting, via the one or more input devices, a first user input that requests to change the first emotional valence value; and in response to detecting the first user input, updating the display of the first user interface, including: changing the shape to have a second appearance different from the first appearance, wherein the second appearance represents a second emotional valence value different from the first emotional valence value; in accordance with a determination that the second emotional valence value is within a second range of emotional valence values that does not overlap with the first range of emotional valence values, changing the first text to second text describing the second range of emotional valence values; and in accordance with a determination that the second emotional valence value is within the first range of emotional valence values, forgoing changing the first text based on the first user input.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: displaying, via the display generation component, a first user interface for logging emotional valence data, the first user interface including: a shape having a first appearance representing a first emotional valence value; and first text describing a first range of emotional valence values, wherein the first range of emotional valence values includes the first emotional valence value; while displaying the first user interface for logging emotional valence data, detecting, via the one or more input devices, a first user input that requests to change the first emotional valence value; and in response to detecting the first user input, updating the display of the first user interface, including: changing the shape to have a second appearance different from the first appearance, wherein the second appearance represents a second emotional valence value different from the first emotional valence value; in accordance with a determination that the second emotional valence value is within a second range of emotional valence values that does not overlap with the first range of emotional valence values, changing the first text to second text describing the second range of emotional valence values; and in accordance with a determination that the second emotional valence value is within the first range of emotional valence values, forgoing changing the first text based on the first user input.

In accordance with some embodiments, a computer system that is configured to communicate with a display generation component and one or more input devices is described. The computer system includes: one or more processors; and memory storing one or more programs configured to be executed by the one or more processors, the one or more programs including instructions for: displaying, via the display generation component, a first user interface for logging emotional valence data, the first user interface including: a shape having a first appearance representing a first emotional valence value; and first text describing a first range of emotional valence values, wherein the first range of emotional valence values includes the first emotional valence value; while displaying the first user interface for logging emotional valence data, detecting, via the one or more input devices, a first user input that requests to change the first emotional valence value; and in response to detecting the first user input, updating the display of the first user interface, including: changing the shape to have a second appearance different from the first appearance, wherein the second appearance represents a second emotional valence value different from the first emotional valence value; in accordance with a determination that the second emotional valence value is within a second range of emotional valence values that does not overlap with the first range of emotional valence values, changing the first text to second text describing the second range of emotional valence values; and in accordance with a determination that the second emotional valence value is within the first range of emotional valence values, forgoing changing the first text based on the first user input.

In accordance with some embodiments, a computer system that is configured to communicate with a display generation component and one or more input devices is described. The computer system includes: means for displaying, via the display generation component, a first user interface for logging emotional valence data, the first user interface including: a shape having a first appearance representing a first emotional valence value; and first text describing a first range of emotional valence values, wherein the first range of emotional valence values includes the first emotional valence value; means, while displaying the first user interface for logging emotional valence data, for detecting, via the one or more input devices, a first user input that requests to change the first emotional valence value; and means, in response to detecting the first user input, for updating the display of the first user interface, including: means for changing the shape to have a second appearance different from the first appearance, wherein the second appearance represents a second emotional valence value different from the first emotional valence value; means, in accordance with a determination that the second emotional valence value is within a second range of emotional valence values that does not overlap with the first range of emotional valence values, for changing the first text to second text describing the second range of emotional valence values; and means, in accordance with a determination that the second emotional valence value is within the first range of emotional valence values, for forgoing changing the first text based on the first user input.

In accordance with some embodiments, a computer program product is described. The computer program product comprises one or more programs configured to be executed by one or more processors of a computer system that is in communication with a display generation component and one or more input devices. The one or more programs include instructions for: displaying, via the display generation component, a first user interface for logging emotional valence data, the first user interface including: a shape having a first appearance representing a first emotional valence value; and first text describing a first range of emotional valence values, wherein the first range of emotional valence values includes the first emotional valence value; while displaying the first user interface for logging emotional valence data, detecting, via the one or more input devices, a first user input that requests to change the first emotional valence value; and in response to detecting the first user input, updating the display of the first user interface, including: changing the shape to have a second appearance different from the first appearance, wherein the second appearance represents a second emotional valence value different from the first emotional valence value; in accordance with a determination that the second emotional valence value is within a second range of emotional valence values that does not overlap with the first range of emotional valence values, changing the first text to second text describing the second range of emotional valence values; and in accordance with a determination that the second emotional valence value is within the first range of emotional valence values, forgoing changing the first text based on the first user input.

In accordance with some embodiments, a method is described. The method is performed at a computer system that is in communication with a display generation component. The method includes: displaying, via the display generation component, a first chart indicating a plurality of emotional valence values logged for a time period, wherein the first chart includes: a user interface object representing a sub-time period of the time period, wherein the user interface object includes: a first indication of a first emotional valence value of the plurality of emotional valence values, wherein the first emotional valence value is for a moment within the sub-time period; and a second indication of a second emotional valence value of the plurality of emotional valence values, wherein the second emotional valence value is different from the first emotional valence value, and wherein the second emotional valence value is for the entire sub-time period.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: displaying, via the display generation component, a first chart indicating a plurality of emotional valence values logged for a time period, wherein the first chart includes: a user interface object representing a sub-time period of the time period, wherein the user interface object includes: a first indication of a first emotional valence value of the plurality of emotional valence values, wherein the first emotional valence value is for a moment within the sub-time period; and a second indication of a second emotional valence value of the plurality of emotional valence values, wherein the second emotional valence value is different from the first emotional valence value, and wherein the second emotional valence value is for the entire sub-time period.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: displaying, via the display generation component, a first chart indicating a plurality of emotional valence values logged for a time period, wherein the first chart includes: a user interface object representing a sub-time period of the time period, wherein the user interface object includes: a first indication of a first emotional valence value of the plurality of emotional valence values, wherein the first emotional valence value is for a moment within the sub-time period; and a second indication of a second emotional valence value of the plurality of emotional valence values, wherein the second emotional valence value is different from the first emotional valence value, and wherein the second emotional valence value is for the entire sub-time period.

In accordance with some embodiments, a computer system that is configured to communicate with a display generation component is described. The computer system includes: one or more processors; and memory storing one or more programs configured to be executed by the one or more processors, the one or more programs including instructions for: displaying, via the display generation component, a first chart indicating a plurality of emotional valence values logged for a time period, wherein the first chart includes: a user interface object representing a sub-time period of the time period, wherein the user interface object includes: a first indication of a first emotional valence value of the plurality of emotional valence values, wherein the first emotional valence value is for a moment within the sub-time period; and a second indication of a second emotional valence value of the plurality of emotional valence values, wherein the second emotional valence value is different from the first emotional valence value, and wherein the second emotional valence value is for the entire sub-time period.

In accordance with some embodiments, a computer system that is configured to communicate with a display generation component and one or more input devices is described. The computer system includes: means for displaying, via the display generation component, a first chart indicating a plurality of emotional valence values logged for a time period, wherein the first chart includes: a user interface object representing a sub-time period of the time period, wherein the user interface object includes: a first indication of a first emotional valence value of the plurality of emotional valence values, wherein the first emotional valence value is for a moment within the sub-time period; and a second indication of a second emotional valence value of the plurality of emotional valence values, wherein the second emotional valence value is different from the first emotional valence value, and wherein the second emotional valence value is for the entire sub-time period.

In accordance with some embodiments, a computer program product is described. The computer program product comprises one or more programs configured to be executed by one or more processors of a computer system that is in communication with a display generation component. The one or more programs include instructions for: displaying, via the display generation component, a first chart indicating a plurality of emotional valence values logged for a time period, wherein the first chart includes: a user interface object representing a sub-time period of the time period, wherein the user interface object includes: a first indication of a first emotional valence value of the plurality of emotional valence values, wherein the first emotional valence value is for a moment within the sub-time period; and a second indication of a second emotional valence value of the plurality of emotional valence values, wherein the second emotional valence value is different from the first emotional valence value, and wherein the second emotional valence value is for the entire sub-time period.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for logging and interacting with emotional valence data, thereby increasing the effectiveness, efficiency, and user satisfaction with such devices. Such methods and interfaces may complement or replace other methods for logging and interacting with emotional valence data.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 is a flow diagram illustrating a method for logging emotional valence data using a computer system, in accordance with some embodiments.

FIG. 9 is a flow diagram illustrating a method for interacting with emotional valence data using a computer system, in accordance with some embodiments.

DESCRIPTION OF EMBODIMENTS

Figure 1A:
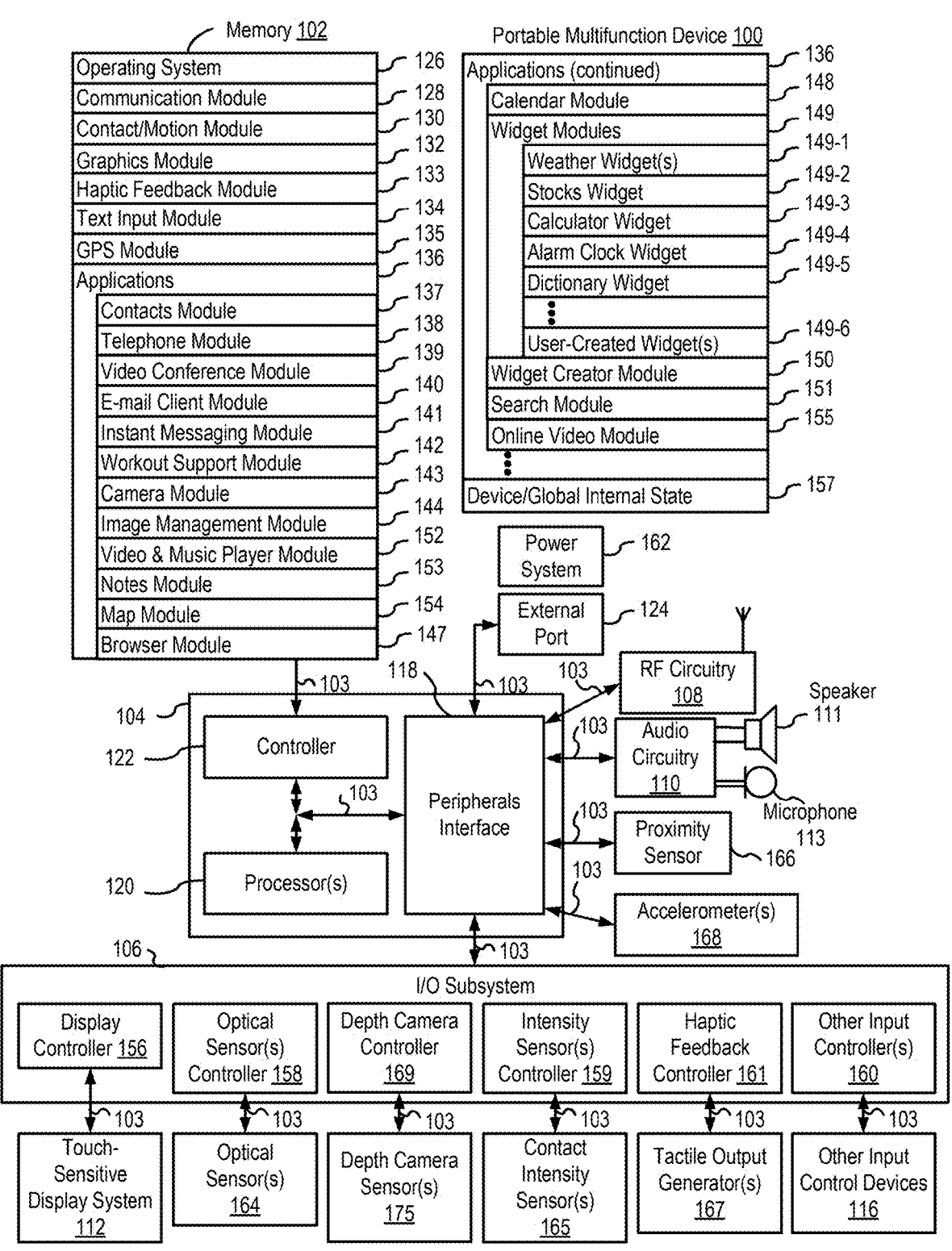
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for logging and interacting with emotional valence data. For example, there is a need for electronic devices that allow efficient and accurate logging of emotional valence data and that allow the user to efficiently interact with the logged data to view and/or determine information relevant to their mental well-being. Such techniques can reduce the cognitive burden on a user who logs and/or interacts with emotional valence data, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for logging and interacting with emotional valence data. FIGS. 6A-6Z illustrate exemplary user interfaces for logging and interacting with emotional valence data. FIG. 7 is a flow diagram illustrating methods of logging and interacting with emotional valence data in accordance with some embodiments. The user interfaces in FIGS. 6A-6Z are used to illustrate the processes described below, including the processes in FIG. 7. FIGS. 8A-8H illustrate exemplary user interfaces for interacting with emotional valence data. FIG. 9 is a flow diagram illustrating methods of interacting with emotional valence data in accordance with some embodiments. The user interfaces in FIGS. 8A-8H are used to illustrate the processes described below, including the processes in FIG. 9.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or providing a more precise input scheme for logging data. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch-pads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component (e.g., a display device such as a head-mounted display (HMD), a display, a projector, a touch-sensitive display, or other device or component that presents visual content to a user, for example on or in the display generation component itself or produced from the display generation component and visible elsewhere). The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touch-screen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
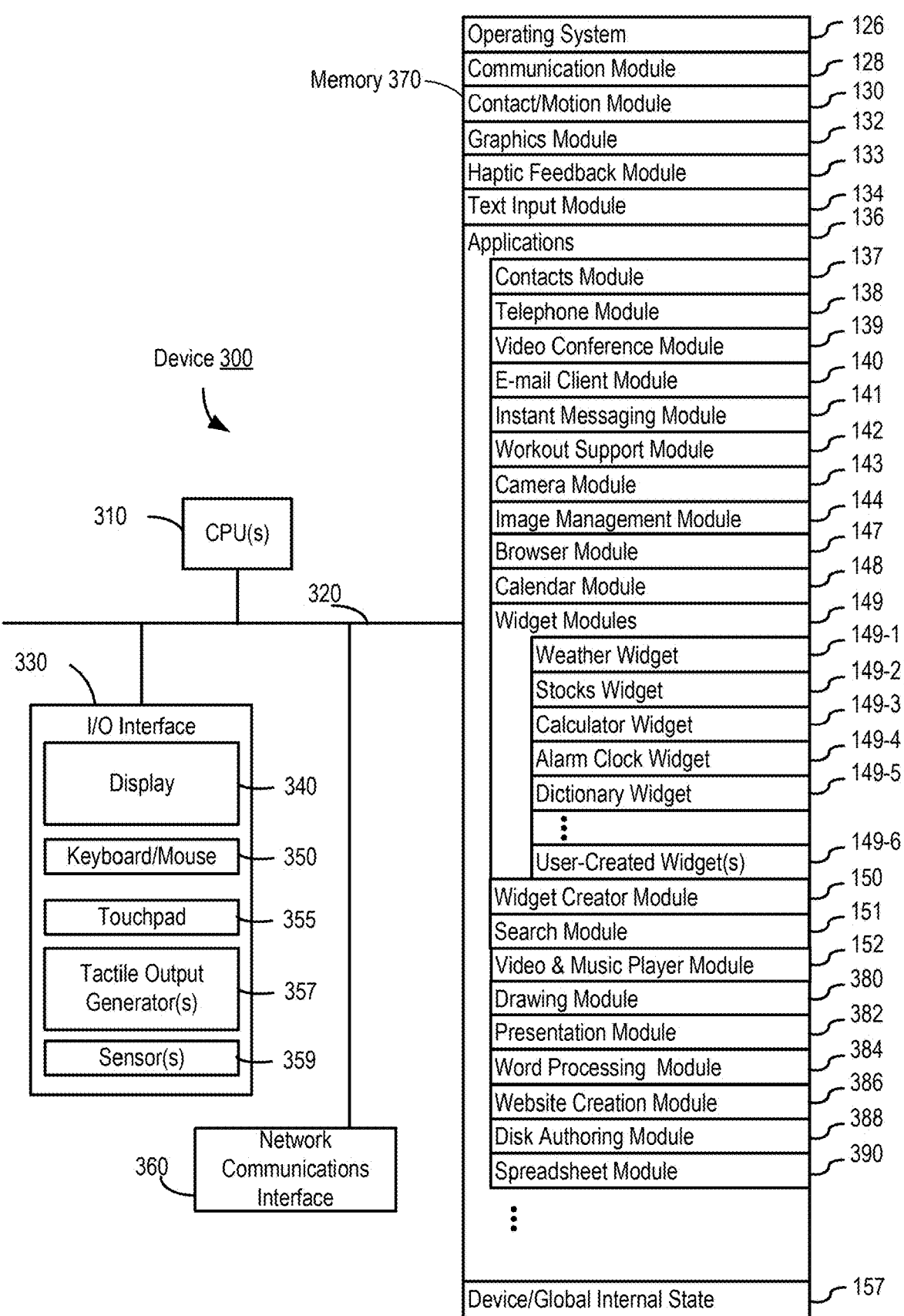
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
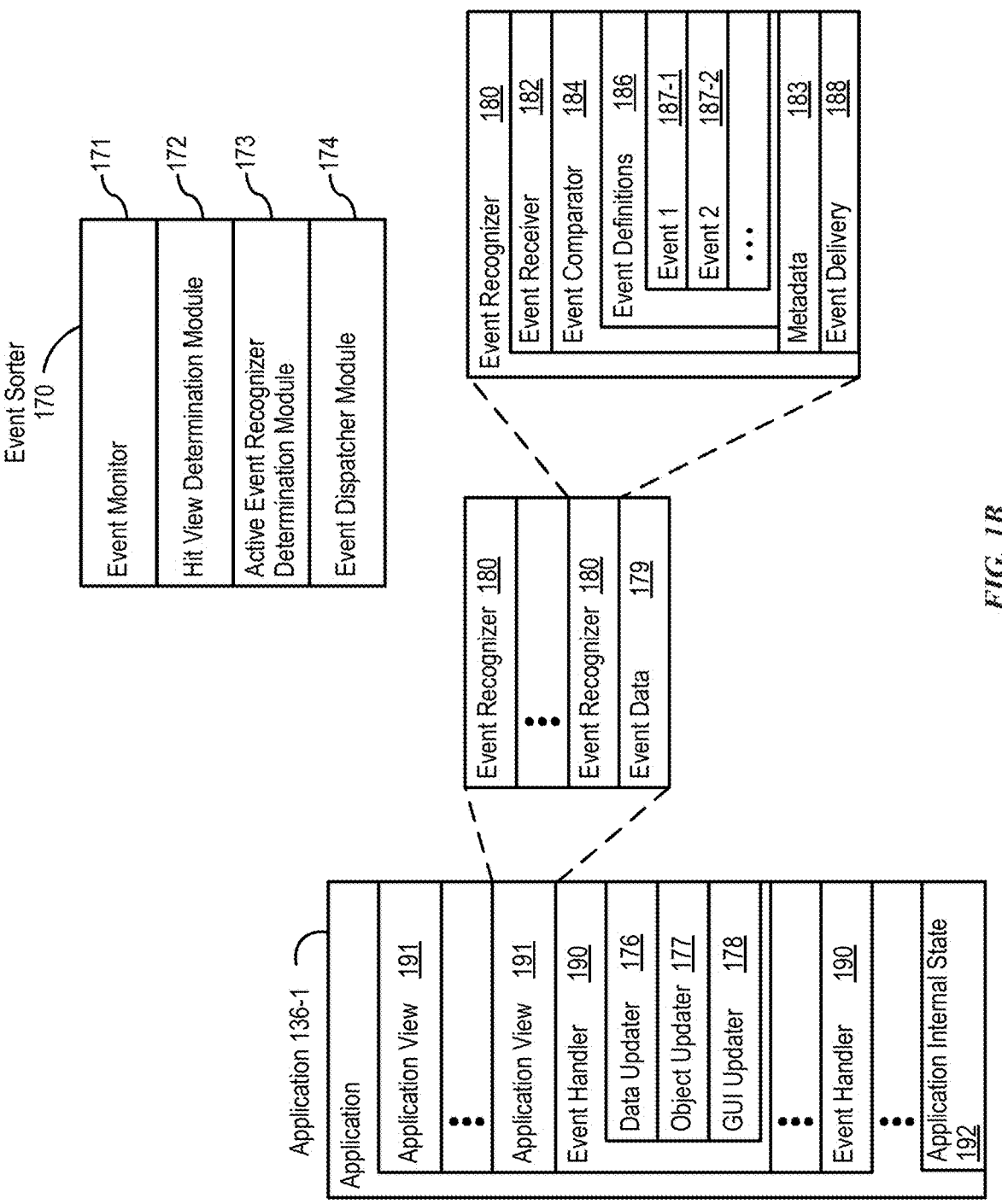
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
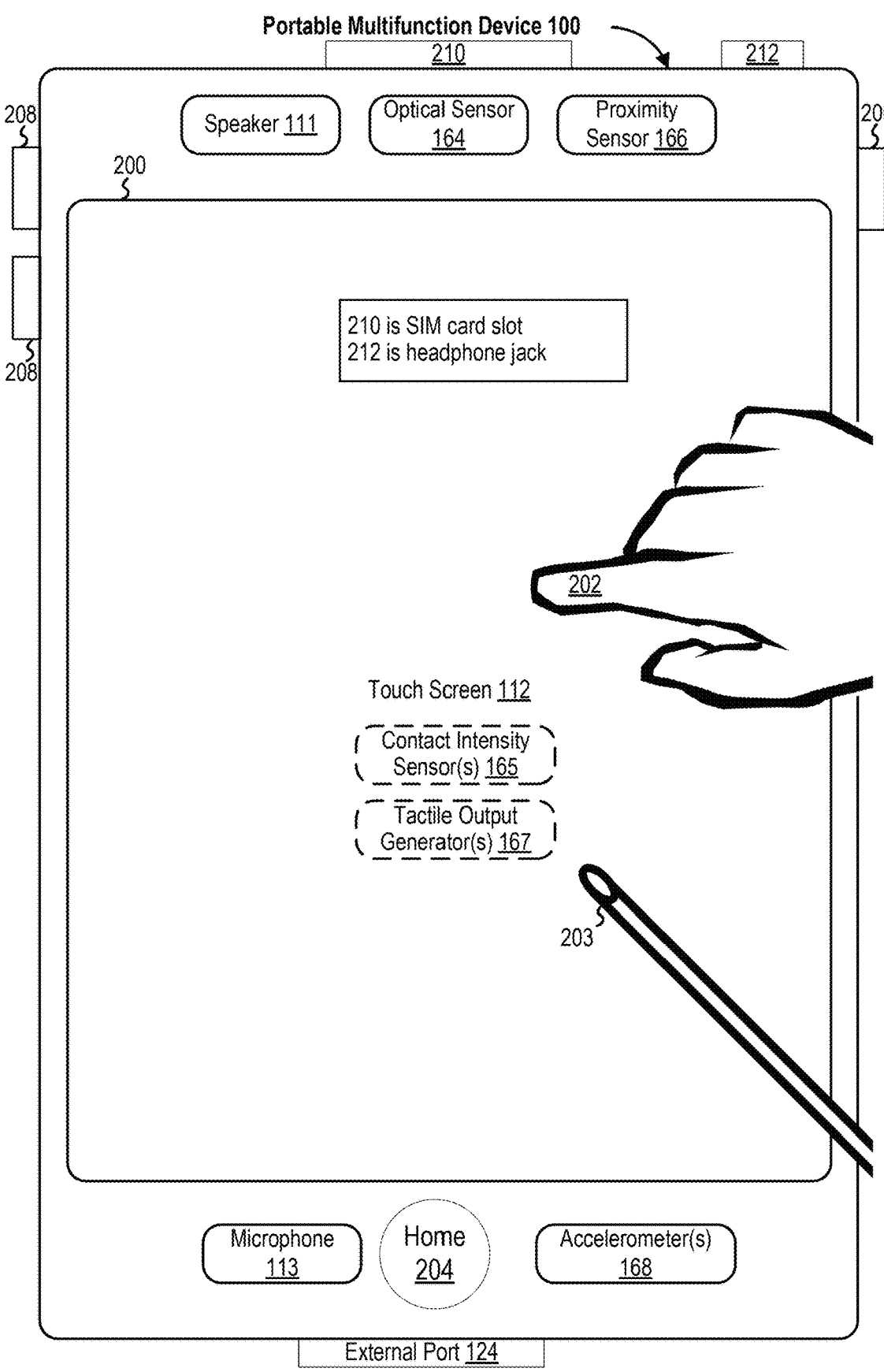
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
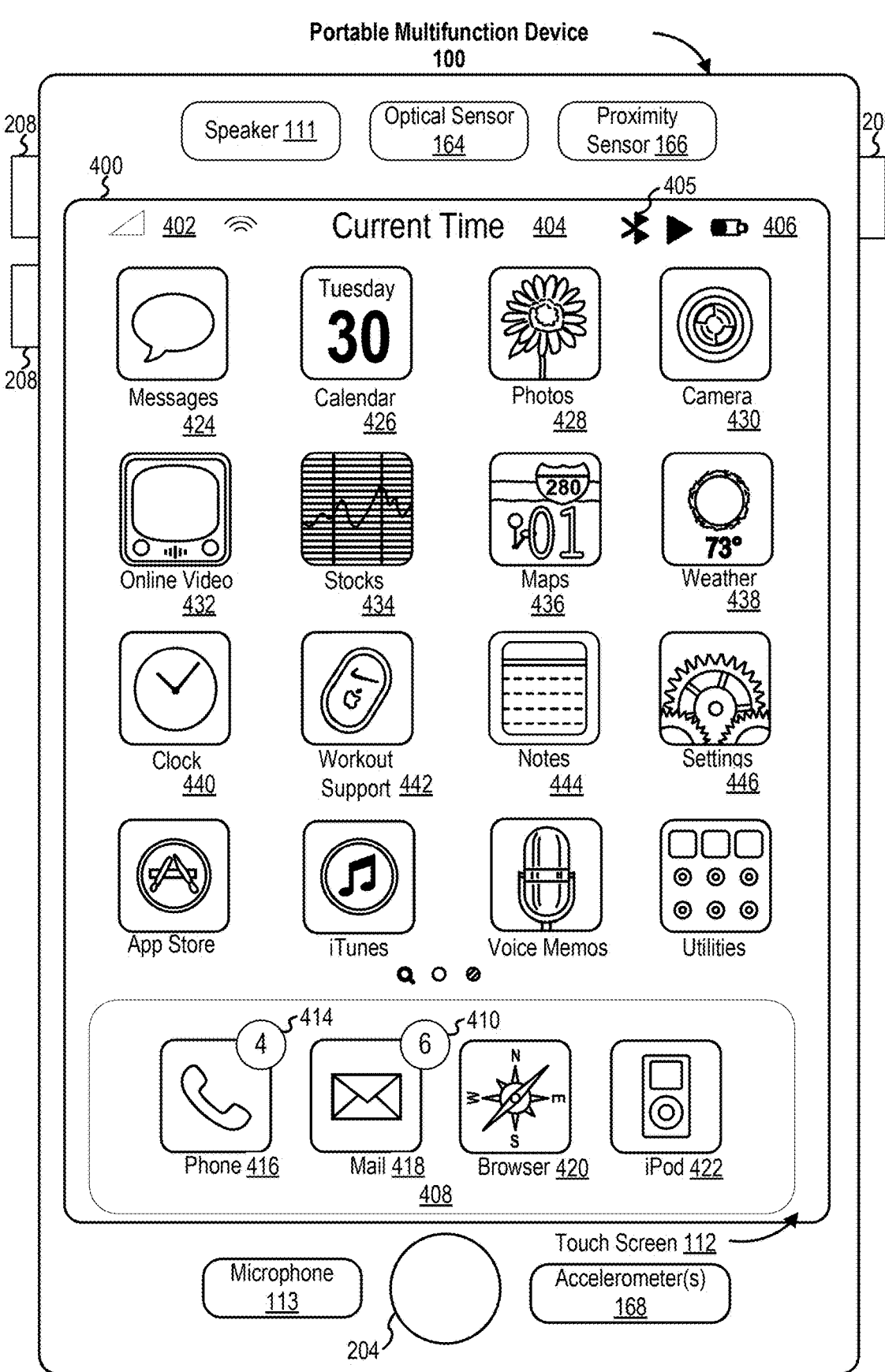
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
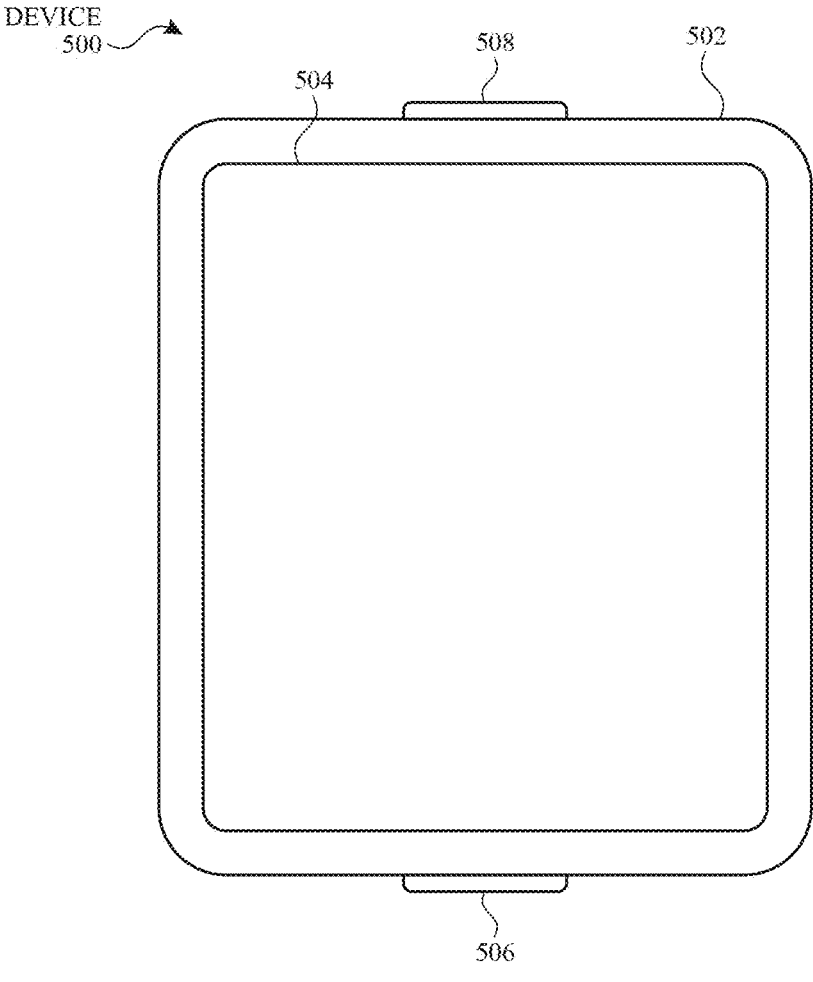
FIG. 5A illustrates a personal electronic device in accordance with some embodiments.
Figures 6A, 6B:
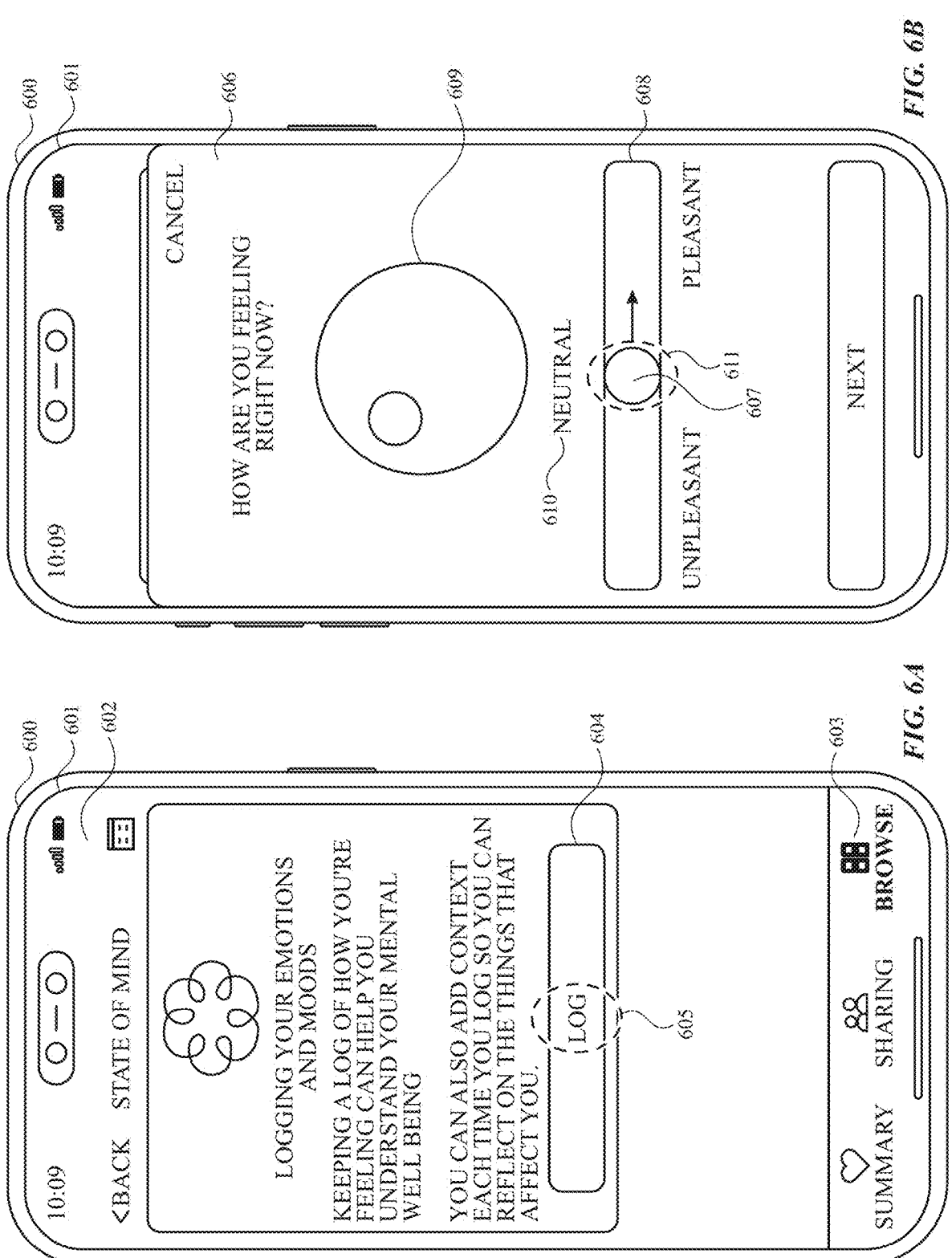
FIGS. 6A-6Z illustrate exemplary user interfaces for logging and interacting with emotional valence data, in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
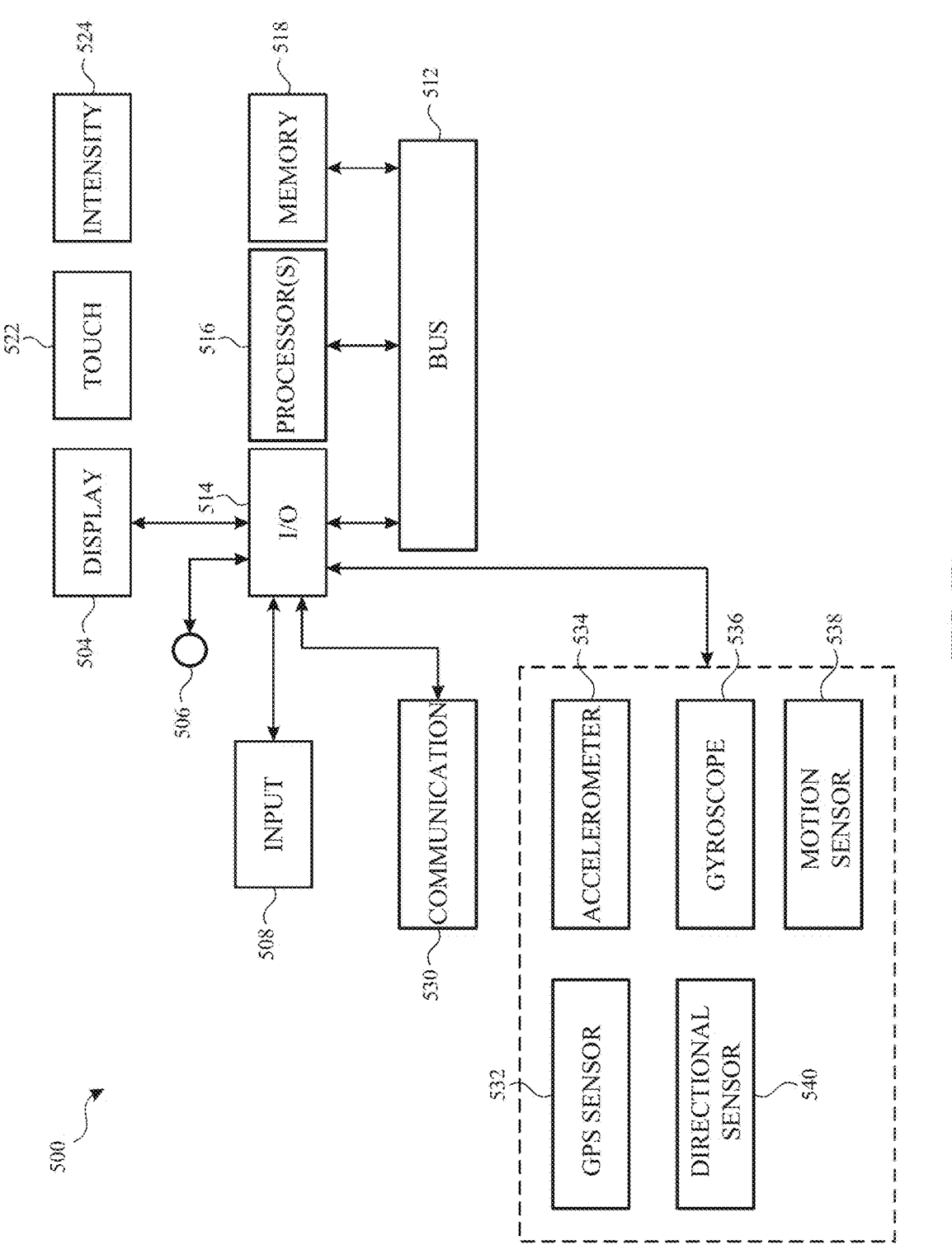
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display screen 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7 and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6Z illustrate exemplary user interfaces for logging and interacting with emotional valence data, in accordance with some embodiments. The user interfaces in these figures are used to illustrate the processes described below, including the processes in FIG. 7.

In FIG. 6A, device 600 displays health application user interface 602 on display 601. Device 600 is implemented as device 100, device 300, or device 500. In the illustrated embodiments, device 600 is implemented as a smartphone device. In other embodiments, device 600 is implemented as another type of device, such as a head mounted device (e.g., a headset or smart glasses), a smart watch, a tablet device, a laptop computer, a desktop computer, a smart speaker, or a smart home device.

In FIG. 6A, device 600 displays health application user interface 602 concurrently with selected browse affordance 603, as indicated by the bolded display of browse affordance 603. When browse affordance 603 is selected, device 600 enables the user to view and/or log various types of health information (e.g., physical activity information, state of mind information (e.g., mindfulness minutes and emotional valence data), body measurement information, hearing information, heart information, menstrual cycle information, nutrition information, and the like) via display of respective health application user interfaces. In the illustrated embodiment, health application user interface 602 is for emotional valence data and includes logging affordance 604 selectable to initiate a process for logging emotional valence data. In FIG. 6A, device 600 receives touch input 605 (e.g., a tap) that selects logging affordance 604. In some embodiments, touch input 605 (and/or other inputs discussed in FIGS. 6A-6Z) is another type of input, such as speech input, keyboard input, mouse input (or other hardware pointer device input), a gesture made with hand (e.g., that is detected via one or more cameras or other image sensors), or a gaze-based input.

In FIG. 6B, in response to receiving touch input 605, device 600 displays logging user interface 606. Logging user interface 606 includes slider affordance 607 and slider bar 608. The position of slider affordance 607 in slider bar 608 corresponds to a respective emotional valence value. Specifically, slider bar 608 allows one hundred different positions of slider affordance 607 that respectively correspond to the emotional valence values of integers from 1-100. A higher emotional valence value indicates a more positive (more pleasant) emotional state whereas a lower emotional valence value indicates a more negative (more unpleasant) emotional state. In FIG. 6B, slider affordance 607 is in the middle of slider bar 608, so the current emotional valence value is 50 and represents a neutral emotional state.

Logging user interface 606 further includes shape 609. Shape 609 has different appearances that each represent a respective emotional valence value. For example, shape 609 has one hundred different appearances that respectively represent the emotional valence values 1-100. In FIG. 6B, shape 609 has an appearance that represents the current emotional valence value of 50. Logging user interface 606 further includes text 610 "neutral". Text 610 describes the range of emotional valence values from 41-60 (inclusive). Device 600 displays text 610 because the current emotional valence value of 50 is within the range. In FIG. 6B, device 600 receives swipe gesture input 611 that requests to move slider affordance 607.

Figures 6C, 6D:
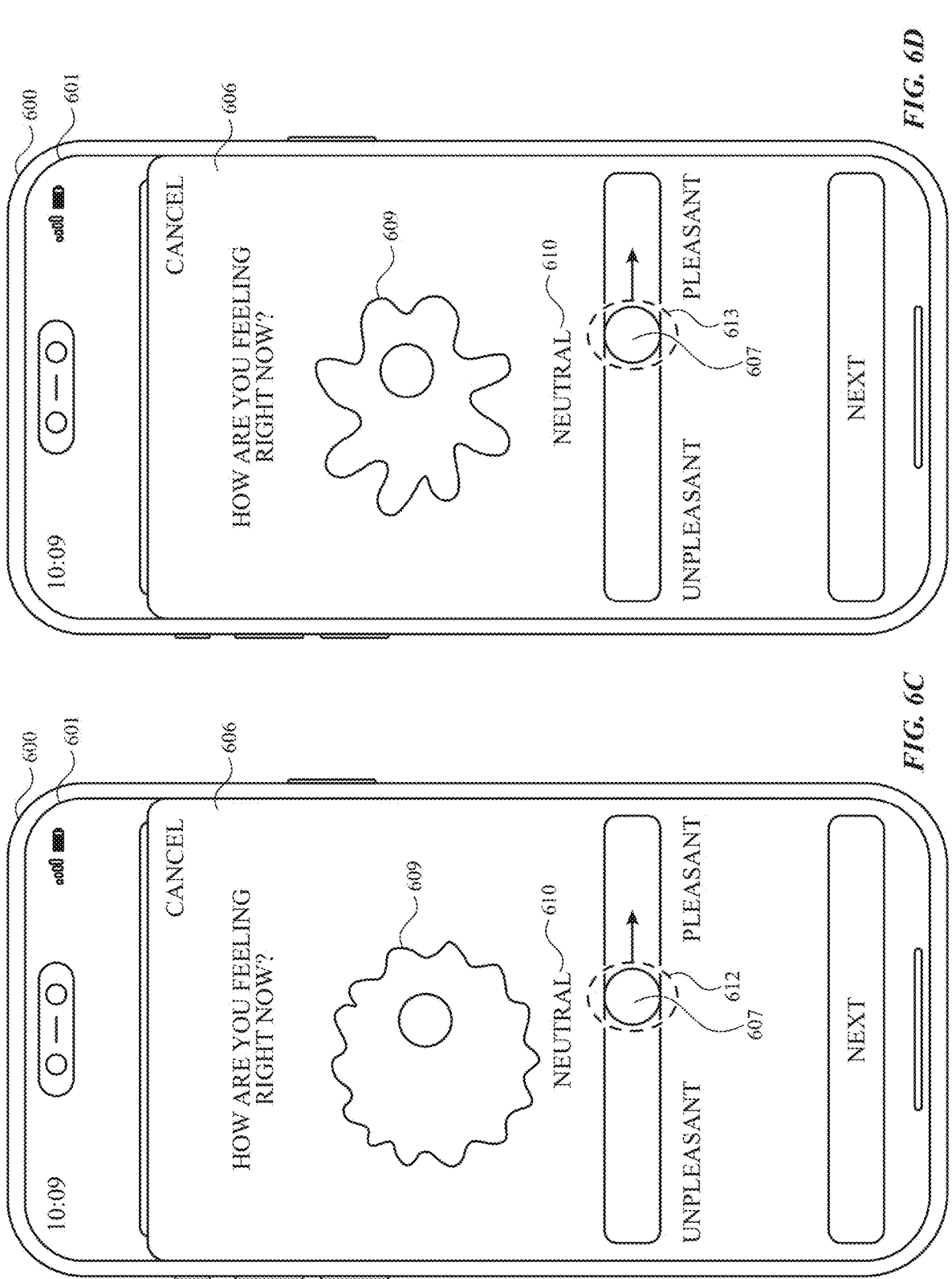

In FIG. 6C, in response to receiving swipe gesture input 611, device 600 moves slider affordance 607 to the right, thereby increasing the emotional valence value to 55. Because the emotional valence value increases from 50 to 55, device 600 updates the appearance of shape 609 to represent the current emotional valence value of 55. Because the current emotional valence of 55 is still within the range 41-60 described by text 610 "neutral," device 600 continues to display text 610. In FIG. 6C, device 600 receives swipe gesture input 612 that requests to move slider affordance 607.

In FIG. 6D, in response to receiving swipe gesture input 612, device 600 moves slider affordance 607 further to the right, thereby increasing the emotional valence value to 60. Because the emotional valence value increases from 55 to 60, device 600 updates the appearance of shape 609 to represent the current emotional valence value of 60. Because the current emotional valence value of 60 is still within the range 41-60 described by text 610 "neutral," device 600 continues to display text 610. In FIG. 6D, device 600 receives swipe gesture input 613 that requests to move slider affordance 607.

Figures 6E, 6F:
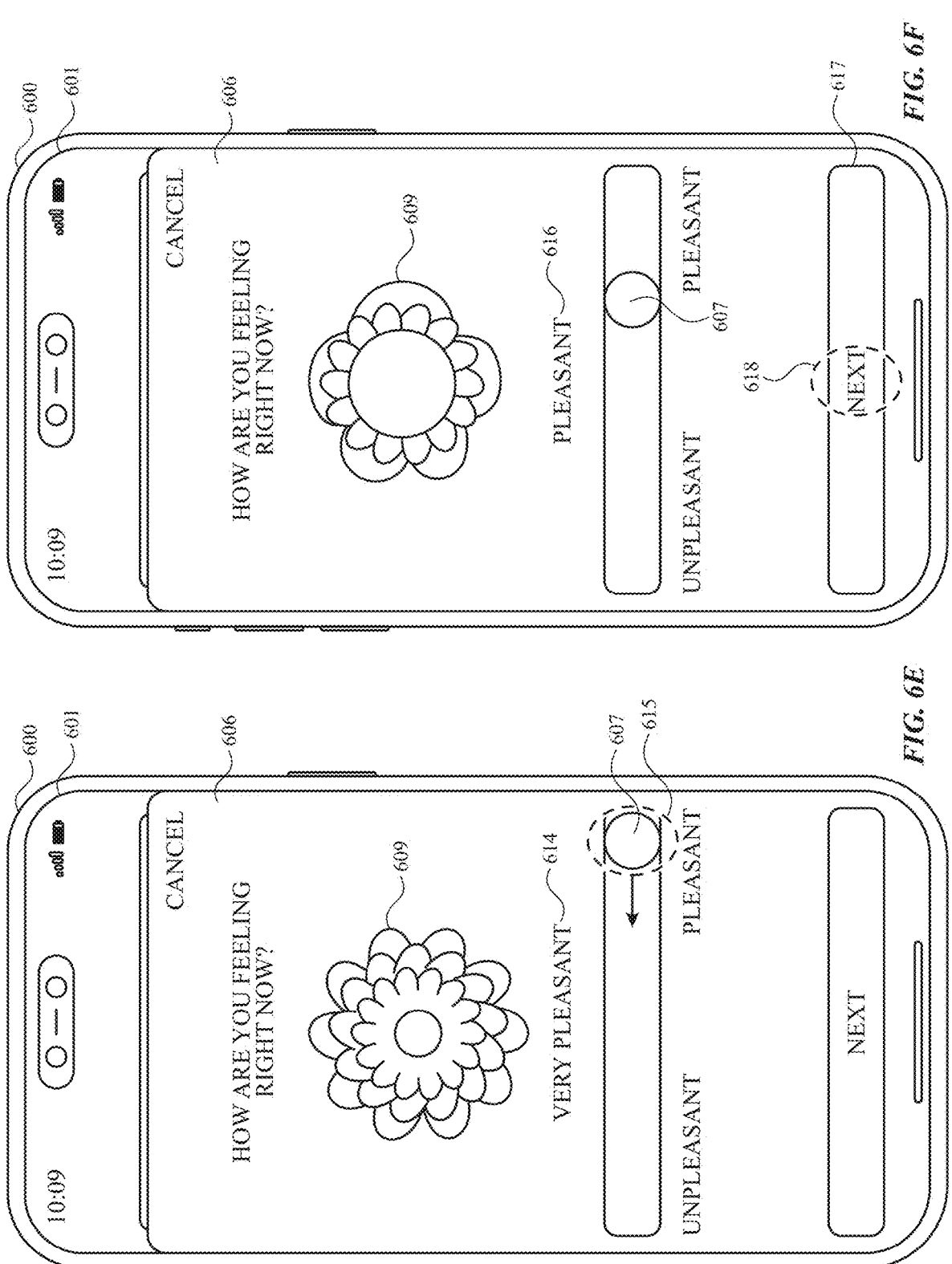

In FIG. 6E, in response to receiving swipe gesture input 613, device 600 moves slider affordance 607 further to the right, thereby increasing the emotional valence value to a maximum value of 100. Because the emotional valence value increases from 60 to 100, device 600 updates the appearance of shape 609 to represent the current emotional valence value of 100. The current emotional valence value is no longer within the range 41-60 (described by text 610 "neutral") and is now within the range 81-100 described by text 614 "very pleasant." Device 600 thus replaces text 610 with text 614. In FIG. 6E, device 600 receives swipe gesture input 615 that requests to move slider affordance 607.

In FIG. 6F, in response to receiving swipe gesture input 615, device 600 moves slider affordance 607 to the left, thereby decreasing the emotional valence value to 75. Because the emotional valence value decreases from 100 to 75, device 600 updates the appearance of shape 609 to represent the current emotional valence value of 75. The current emotional valence value is no longer within the range 81-100 (described by text 614 "very pleasant") and is now within the range 61-80 described by text 616 "pleasant." Device 600 thus replaces text 614 with text 616.

Logging user interface 606 further includes next affordance 617 selectable to proceed to a next step in logging the emotional valence data. In FIG. 6F, device 600 receives touch input 618 that selects next affordance 617.

Figures 6G, 6H:
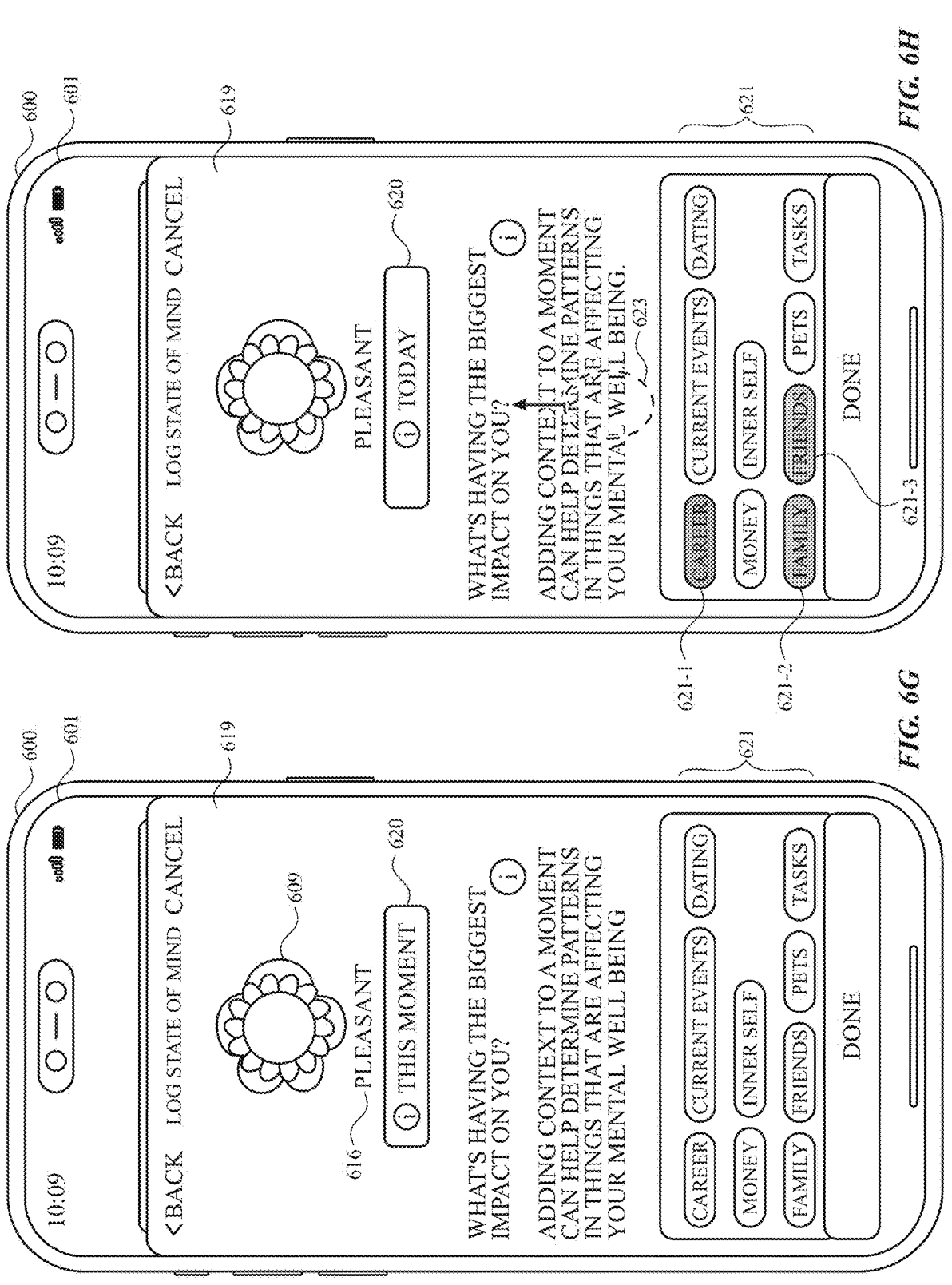

In FIG. 6G, in response to receiving touch input 618, device 600 displays context user interface 619. Context user interface 619 includes shape 609 with an appearance that represents the current emotional valence value and includes text 616. Context user interface 619 further includes time affordance 620 that indicates a time value for the current emotional valence value of 75. The time value is a default value of "this moment" (i.e., 10:09 AM), and thereby indicates that the user feels pleasant at 10:09 AM. The time value defaults to the value of "this moment" because device 600 received touch input 618 (and/or received touch input 605 that requests to log emotional valence data) during an early part of the current day (e.g., before 6 PM), as opposed to a later part of the current day, e.g., after 6 PM. In other embodiments, if device 600 received touch input 618 (and/or received touch input 605) during the later part of the current day, the time value defaults to the value of "today" (i.e., the entire day), thereby indicating that the user overall had a pleasant day.

In FIG. 6G, context user interface 619 further includes association affordances 621. Association affordances 621 represent respective associations (e.g., factors) that the user can select as contributing to the current emotional valence value. In FIGS. 6G-6J, association affordances 621 represent the associations career, current events, dating, money, inner self, family, friends, pets, tasks, society, spirituality, travel, and hobbies. Selection of expand affordance 622 in FIG. 6I causes device 600 to display additional association affordances 621. In some embodiments, each association represented by an association affordance is predefined by device 600, e.g., predefined by a programmer and/or a designer of the health application.

In FIG. 6H, device 600 has received a set of one or more inputs to change the time value from the default value of "this moment" to "today." Time affordance 620 now indicates the changed time value, i.e., indicates that the user overall had a pleasant day. In FIG. 6H, device 600 has also received a set of one or more inputs that selected the association affordances 621-1 for career, 621-2 for family, and 621-3 for friends. Selection of association affordances 621-1, 621-2, and 621-3 (as indicated by the change in appearances of the association affordances) indicates that the user's career, family, and friends contributed to their overall pleasant day. In FIG. 6H, device 600 further receives swipe gesture input 623 to scroll down context user interface 619.

Figures 6I, 6J:
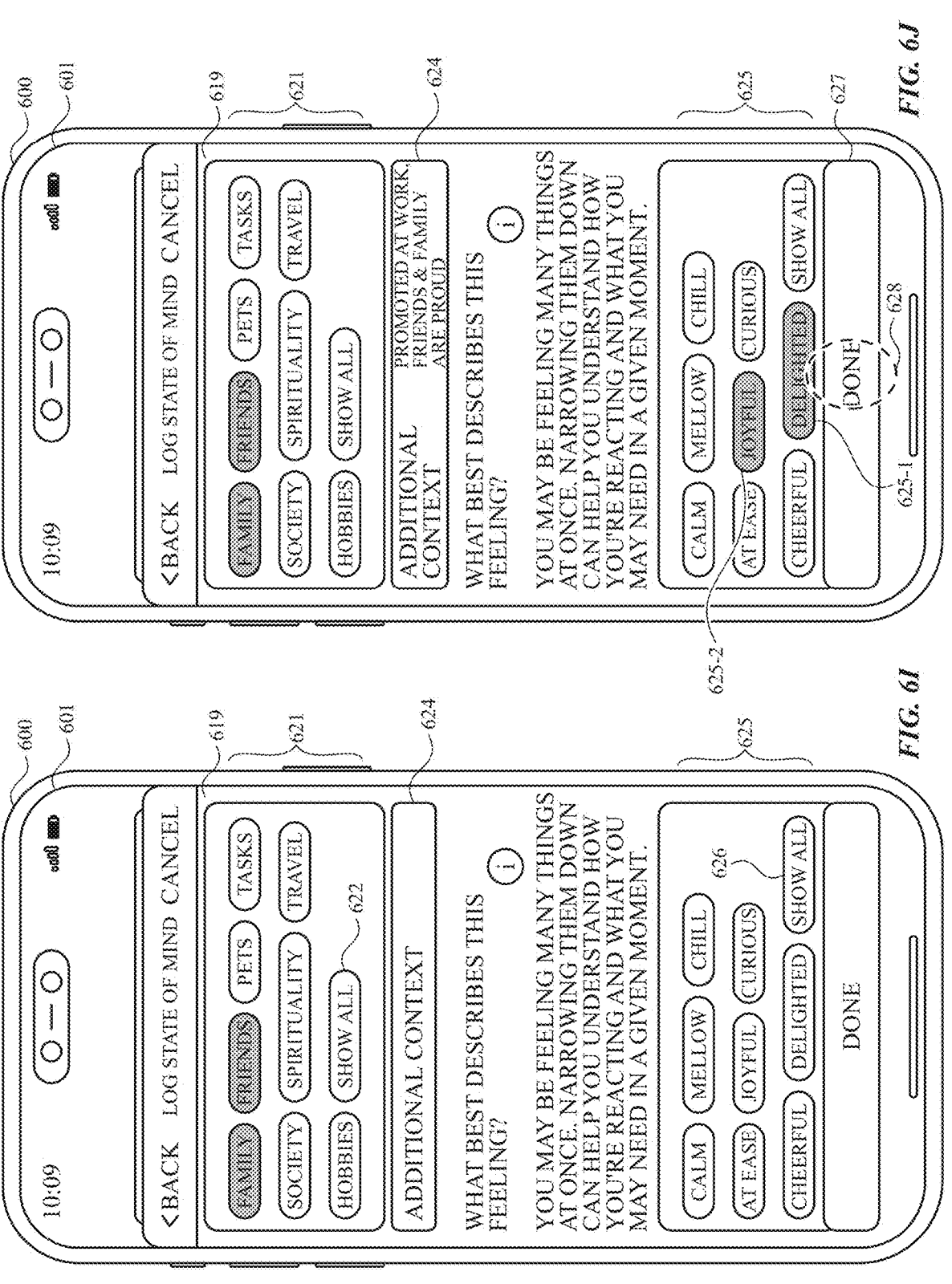

In FIG. 6I, in response to receiving swipe gesture input 623, device 600 scrolls down context user interface 619 to display a bottom portion of context user interface 619. Context user interface 619 includes additional context affordance 624. Additional context affordance 624 is selectable to allow entry of text that describes the current emotional valence value. Context user interface 619 also includes label affordances 625. Label affordances 625 represent respective labels that the user can select to describe the current emotional valence value. In FIGS. 6I and 6J, label affordances 625 represent the labels calm, mellow, chill, at ease, joyful, curious, cheerful, and delighted. Selection of expand affordance 626 in FIG. 6I causes device 600 to display additional label affordances 625. In some embodiments, each label represented by a label affordance is predefined by device 600, e.g., predefined by a programmer and/or a designer of the health application.

In FIGS. 6I and 6J, device 600 displays label affordances 625 in an order based on the current emotional valence value. In particular, because the current emotional valence value corresponds to a positive emotional state, device 600 displays label affordances representing more positive labels (e.g., calm, mellow, and chill) at the beginning of the list of label affordances 625. In some embodiments, because the current emotional valence value corresponds to a positive emotional state, device 600 displays label affordances representing more negative labels (e.g., sad, angry, and frustrated) at the end of the list of label affordances 625 or does not display such label affordances until device 600 receives user input that selects expand affordance 626.

In FIG. 6J, device 600 has received a set of one or more inputs (including an input that selects additional context affordance 624) to enter text in additional context affordance 624. Device 600 thus displays the entered text "got promoted at work, friends & family are proud" in additional context affordance 624. In FIG. 6J, device 600 further received a set of one or more inputs that selected the label affordances 625-1 for delighted and 625-2 for joyful. Selection of label affordances 625-1 and 625-2 (as indicated by the change in appearances of the label affordances) thereby indicates that the user chose the labels delighted and joyful to describe their overall pleasant day.

Context user interface 619 further includes done affordance 627. Done affordance 627 is selectable to finish the process of logging emotional valence data described above with respect to FIGS. 6A-6J. In FIG. 6J, device 600 receives touch input 628 that selects done affordance 627. The operations device 600 performs in response to receiving touch input 628 are described with respect to FIG. 6P below.

FIGS. 6K-6O illustrate techniques and user interfaces for logging emotional valence data at electronic device 630 that includes display 631 and crown 632 (e.g., implemented as input mechanism 506). In the illustrated embodiments, device 630 is implemented as a smart watch. In other embodiments, device 630 is implemented as another type of device, such as a head mounted device (e.g., a headset or smart glasses), a smartphone, a tablet device, a laptop computer, a desktop computer, a smart speaker, or a smart home device.

In FIG. 6K, device 630 displays health application user interface 633 on display 631. Health application user interface 633 includes logging affordance 634 selectable to initiate a process for logging emotional valence data. In FIG. 6K, device 630 receives touch input 635 that selects logging affordance 634.

In FIG. 6L, in response to receiving touch input 635, device 630 displays logging user interface 636. Logging user interface 636 includes shape 637. Similar to shape 609, shape 637 has different appearances (e.g., one hundred different appearances) that each represent a respective emotional valence value (e.g., an integer in the range 1-100). In FIG. 6L, the current emotional valence value is 50 and shape 637 has an appearance that represents the current emotional valence value. Further, because the current emotional valence value is within the range 41-60, logging user interface 636 includes text 640 "neutral" that describes emotional valence values in the range 41-60.

The current emotional valence value in FIG. 6L corresponds to an initial position of crown 632 when device 600 initially displays logging user interface 636. In FIG. 6L, device 630 receives input 638 that rotates crown 632 in a clockwise direction. In FIG. 6M, in response to receiving input 638, device 630 decreases the emotional valence value by an amount proportional to the amount of rotation (e.g., the amount of rotation relative to the initial position of crown 632). In particular, based on the amount of clockwise rotation of input 638, device 630 decreases the emotional valence value from 50 to 45, so the current emotional valence value in FIG. 6M corresponds to the new rotated position of crown 632. In some embodiments, if input 638 instead rotates crown 632 in a counter-clockwise direction, device 630 increases the emotional valence value by an amount proportional to the amount of counter-clockwise rotation.

In FIG. 6M, because the emotional valence value decreased from 50 to 45, device 630 updates the appearance of shape 637 to represent the current emotional valence value 45. Because the current emotional valence value is still within the range 41-60 described by text 640 "neutral", device 630 continues to display text 640. In FIG. 6M, device 630 receives input 639 that further rotates crown 632 in the clockwise rotation.

Figures 6N, 6O:
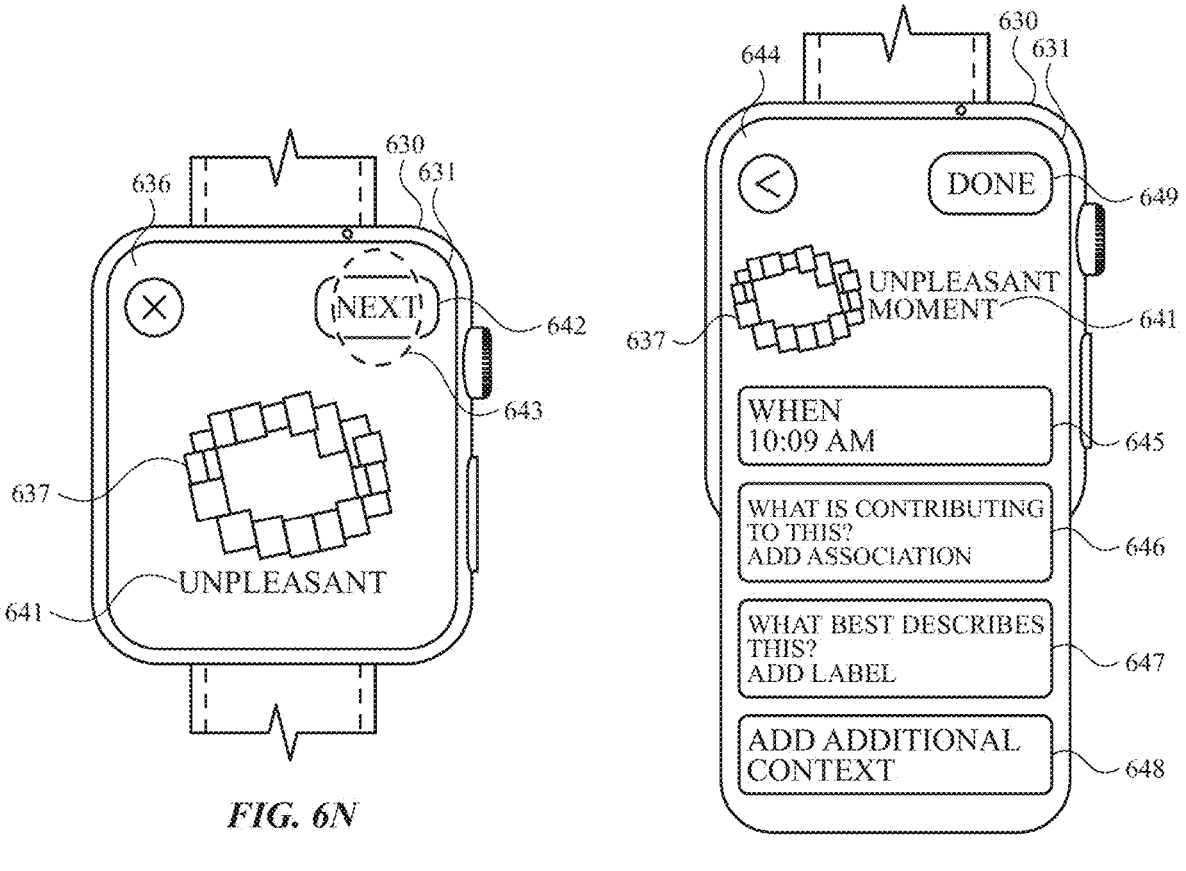

In FIG. 6N, in response to receiving input 639, device 630 decreases the emotional valence value by an amount proportional to the amount of rotation. In particular, based on the amount of clockwise rotation of input 639, device 630 decreases the emotional valence value from 45 to 35. Device 630 thus updates the appearance of shape 637 to represent the current emotional valence value 35. Because the current emotional valence value is no longer within the range 41-60 (described by text 640) and is now in the range 21-40 (described by text 641 "unpleasant"), in FIG. 6N, device replaces text 640 with text 641.

While the embodiments of FIGS. 6L-6N show that rotation of crown 632 in a clockwise direction decreases the emotional valence value (so rotation of crown 632 in a counter-clockwise direction increases the emotional valence value), in other embodiments rotation of crown 632 in a clockwise direction increases the emotional valence value (so rotation of crown 632 in a counter-clockwise direction decreases the emotional valence value). In some embodiments, a user-adjustable setting of device 630 specifies whether rotation of crown 632 in a particular direction increases or decreases the emotional valence value. In some embodiments, whether rotation of crown 632 in a particular direction increases or decreases the emotional valence value is defined by a setting of device 630 that controls whether rotation of crown 632 in the particular direction scrolls a user interface upwards or downwards. For example, if the setting specifies that rotation of crown 632 in the particular direction scrolls the user interface upwards, rotation of crown in the particular direction increases the emotional valence value. If the setting specifies that rotation of crown 632 in the particular direction scrolls the user interface downwards, rotation of crown 632 in the particular direction decreases the emotional valence value.

In FIG. 6N, logging user interface 636 includes next affordance 642. Next affordance 642 is selectable to proceed to a next step in the process of logging emotional valence data. Device 630 receives touch input 643 that selects next affordance 642.

Figures 6P, 6Q:
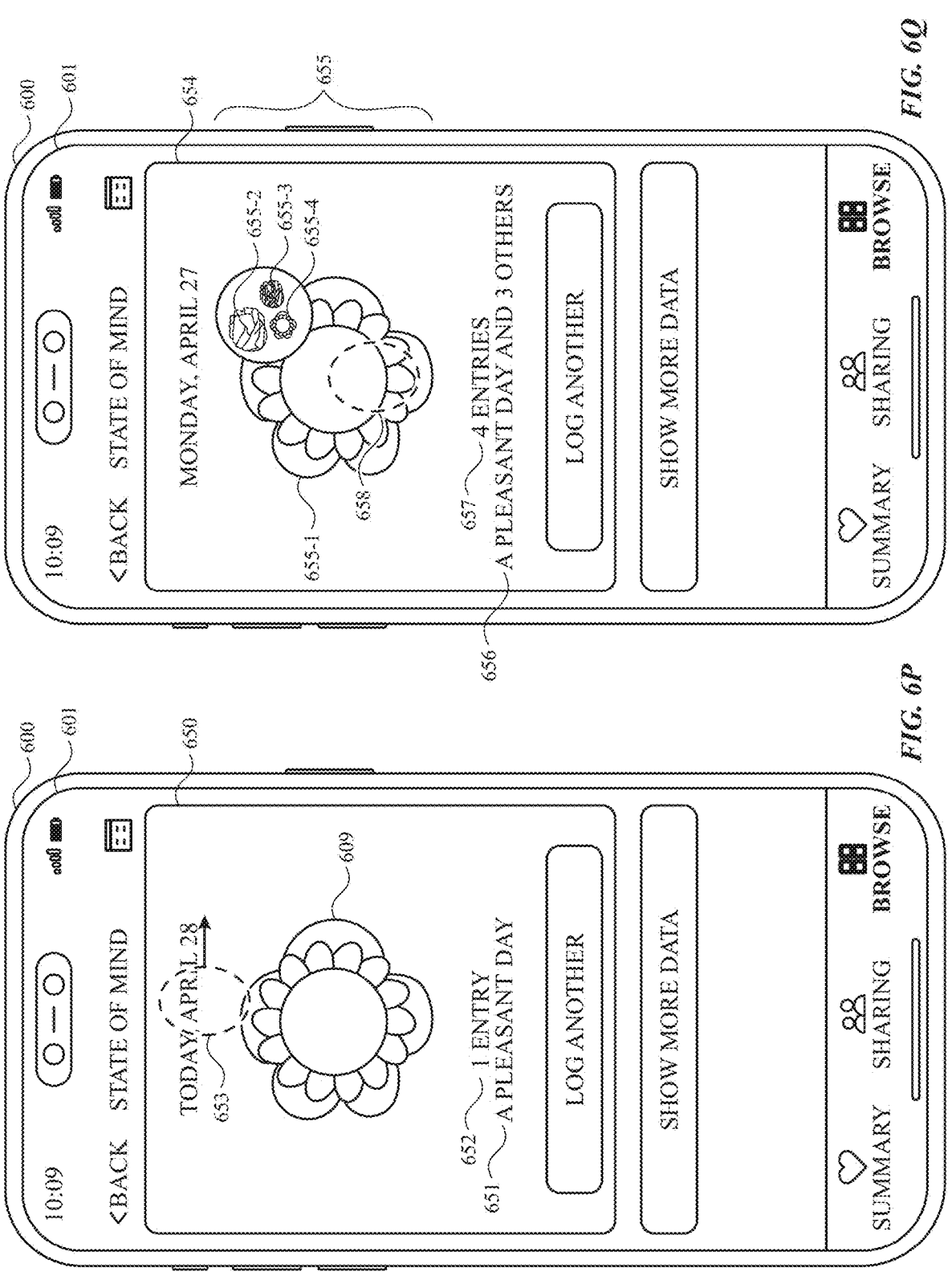

In FIG. 6O, in response to receiving touch input 643, device 630 displays context user interface 644. Context user interface 644 includes shape 637 with an appearance that represents the current emotional valence value and text 641. Context user interface 644 includes time affordance 645. Similar to time affordance 620, time affordance 645 indicates a time value for the current emotional valence value. The time value is a default value of 10:09 AM that depends on when touch input 635 and/or touch input 643 are received (e.g., depends on whether touch input 635 and/or touch input 643 are received before the end of the day, e.g., before 6 PM). Time affordance 645 is selectable to change the default time value to another time value, such as to another moment in time or to the entire current day. Context user interface 644 includes associations affordance 646. Associations affordance 646 is selectable to add associations to the current emotional valence value, e.g., according to techniques analogous to those described above with respect to FIGS. 6G and 6H. Context user interface 644 includes labels affordance 647. Labels affordance 647 is selectable to add labels to the current emotional valence value, e.g., according to techniques analogous to those described above with respect to FIGS. 6I-6J. Context user interface 644 includes additional context affordance 648. Additional context affordance 648 is selectable to enable entry of text describing the current emotional valence value, e.g., according to techniques analogous to those described above with respect to FIGS. 6I-6J. Context user interface 644 includes done affordance 649. Done affordance 649 is selectable to finish the process for logging emotional valence data described above with respect to FIGS. 6K-6O. FIG. 6P, below, describes finishing the process for logging emotional valence data.

In FIG. 6P, in response to receiving touch input 628 (that selects done affordance 627 in FIG. 6J), device 600 logs the current emotional valence data. In particular, device 600 logs the current emotional valence value (75, in FIG. 6J), the appearance of shape 609 representing the current emotional valence value, text 616, the time value (the entire day), the selected associations (family, friends, and career), the entered text ("promoted at work, family & friends are proud"), and the selected labels (joyful and delighted). In some embodiments, in response to receiving an input that selects done affordance 649 in FIG. 6O, device 630 logs the current emotional valence data in an analogous manner.

In FIG. 6P, in response to receiving touch input 628, device 600 displays day affordance 650 representing the current day of Apr. 28, 2022. Day affordance 650 includes shape 609 with an appearance representing the emotional valence value logged for the entire day, text 651 describing the range of emotional valence values that the current emotional valence value is within, and number 652 of emotional valence values logged for the day.

In FIG. 6P, device 600 receives swipe gesture input 653 that requests to display day affordance 654 for the previous day of Apr. 27, 2022. In FIG. 6Q, in response to receiving swipe gesture input 653, device 600 replaces day affordance 650 with day affordance 654. Day affordance 654 includes shapes 655 having respective appearances that represent different emotional valence values logged for the previous day. The emotional valence values were logged for the previous day according to the techniques discussed above with respect to FIGS. 6A-6O. Shape 655-1 is larger than each of shapes 655-2, 655-3, and 655-4 and occupies a different portion of day affordance 654 than each of shapes 655-2, 655-3, and 655-4 because shape 655-1 represents an emotional valence value logged for the entire previous day while each of shapes 655-2, 655-3, and 655-4 represent respective emotional valence values logged for different moments during the previous day. Day affordance 654 further includes text 656 describing a range of emotional valence values (that the emotional valence value logged for the entire previous day is within) and number 657 of emotional valence values logged for the previous day. In FIG. 6Q, device 600 receives touch input 658 on day affordance 654.

Figures 6R, 6S:
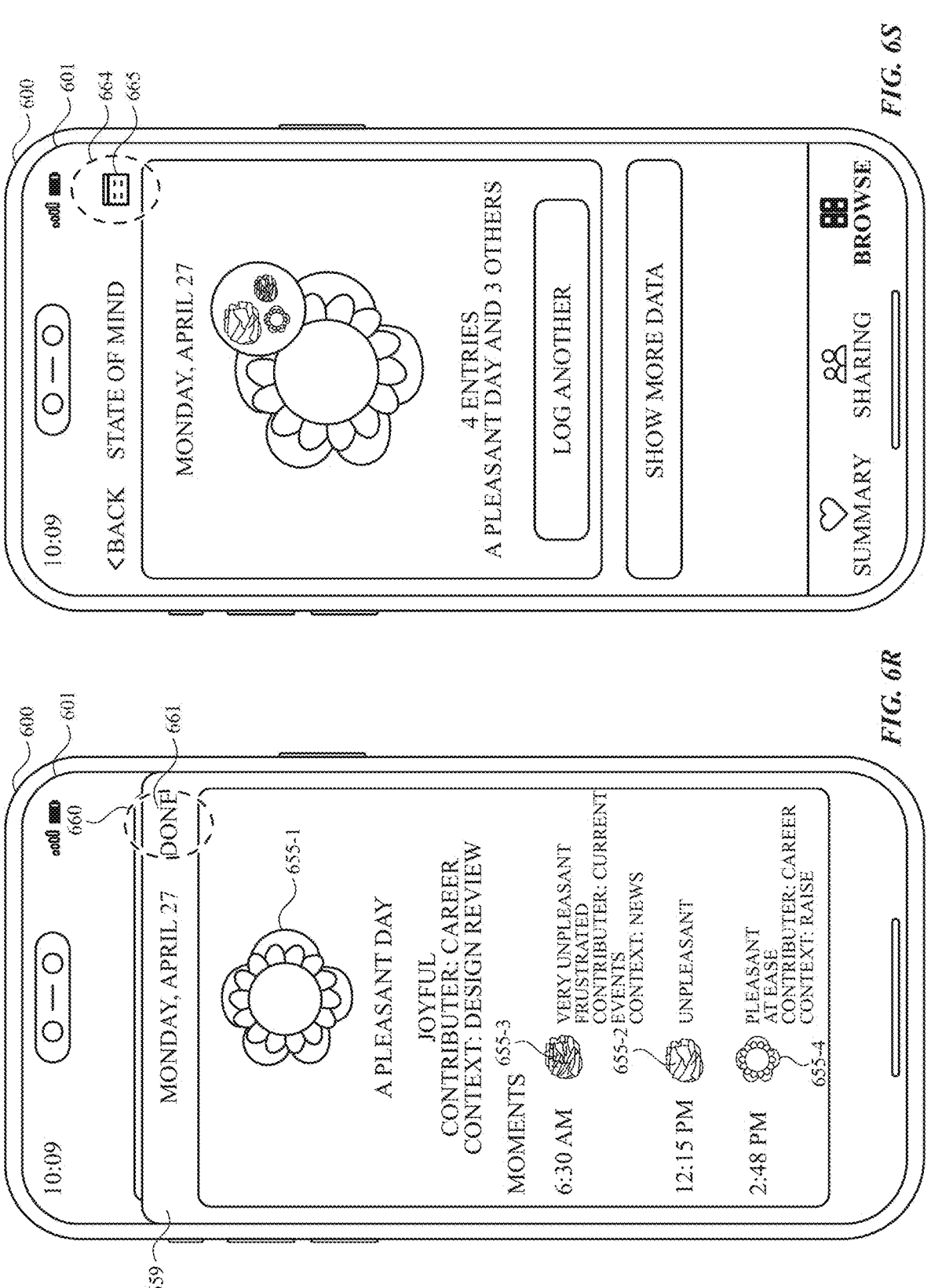

In FIG. 6R, in response to receiving touch input 658, device 600 displays detail user interface 659 for the previous day. Detail user interface 659 provides more detail about the emotional valence data logged for the previous day than day affordance 654 does. Specifically, detail user interface 659 includes shape 655-1 with an appearance that represents the daily emotional valence value (the emotional valence value logged for the entire previous day), the text "pleasant" describing the corresponding range of emotional valence values, the label "joyful" the user selected for the daily emotional valence value, the association "career" the user attributed to the daily emotional valence value, and the text "design review" the user entered for the daily emotional valence value. Detail user interface 659 further includes shapes 655-1, 655-2, and 655-3 having respective appearances representing momentary emotional valence values logged for the previous day. Detail user interface 659 further includes, for each of the momentary emotional valence values, the corresponding time value, text describing the corresponding range of emotional valence values, and if logged, label(s) the user selected for the momentary emotional valence value, association(s) the user selected for the momentary emotional valence value, and/or text the user entered for the momentary emotional valence value. In FIG. 6R, device 600 receives touch input 660 that selects done affordance 661.

In FIG. 6S, in response to receiving touch input 660, device 600 re-displays the content of FIG. 6Q. Device 600 further receives touch input 664 that selects calendar affordance 665.

Figures 6T, 6U:
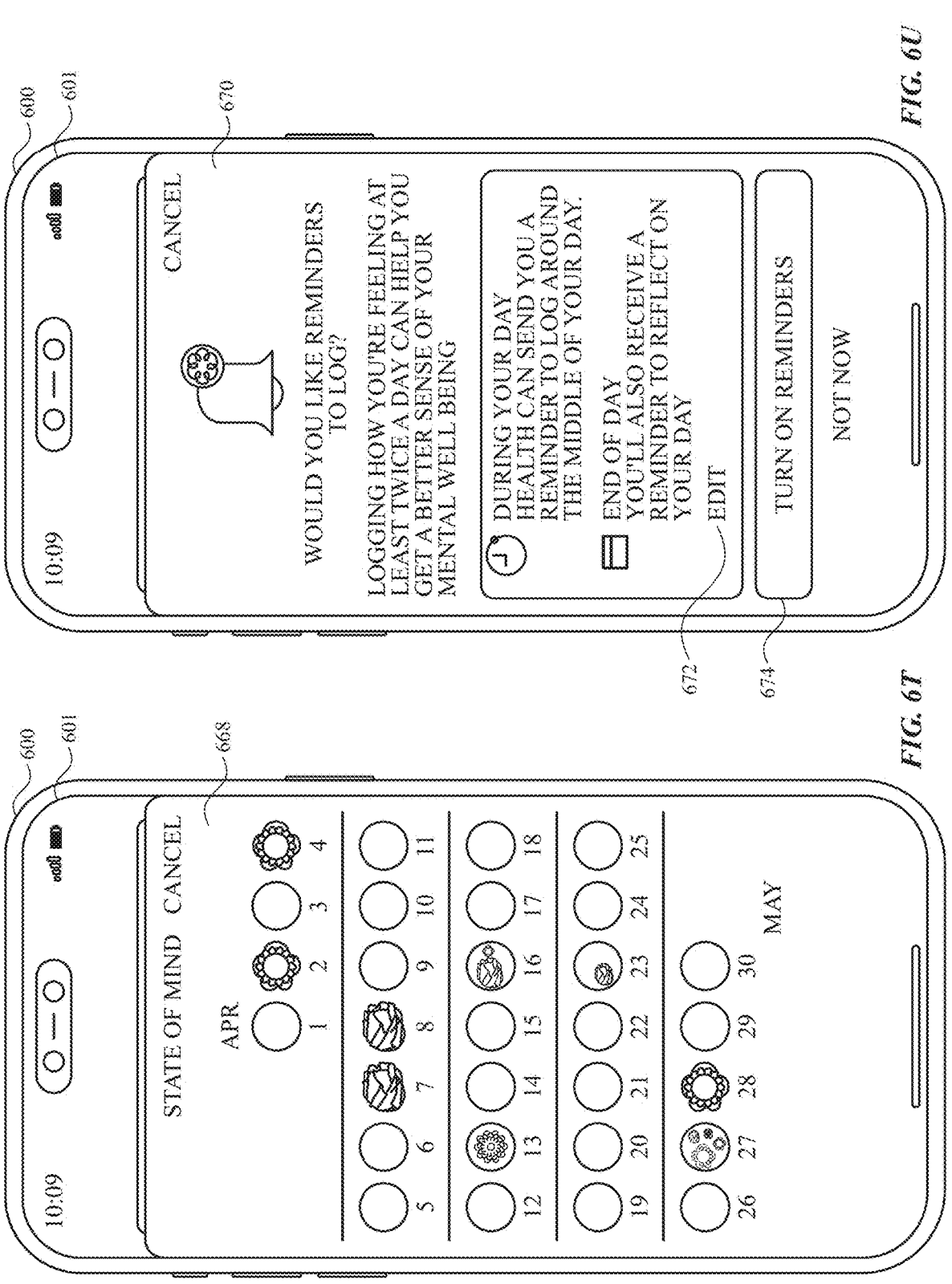

In FIG. 6T, in response to receiving touch input 664, device 600 displays calendar 668 that indicates the emotional valence values logged for the current month of April. As shown, calendar 668 indicates that emotional valence values were logged for April $2^{nd}$, $4^{th}$, $7^{th}$, $8^{th}$, $13^{th}$, $16^{th}$, $23^{rd}$, $27^{th}$, and $28^{th}$. In calendar 668, for a day, if only an emotional valence value is logged for the entire day (meaning no momentary emotional valence values are logged for the day), the shape representing the daily emotional valence value occupies the entire area (e.g., circle) for the day, as shown by the respective shapes for April $2^{nd}$, $4^{th}$, $7^{th}$, $8^{th}$, and $28^{th}$. In calendar 668, for a day, if only momentary emotional valence value(s) are logged (meaning no daily value is logged for the day), the shape(s) representing the momentary emotional valence value(s) do not occupy the entire area for the day, as shown by the shape for April $13^{th}$ and the shape for April $23^{rd}$. In calendar 668, for a day, if both an emotional valence value for the entire day and momentary emotional valence value(s) are logged, neither the shape representing the daily emotional valence value nor the shape(s) representing the momentary emotional valence value(s) occupy the entire area for the day. Rather, device 600 displays, in the area for the day, the shape representing the daily emotional valence value as larger than each of the shape(s) representing the momentary emotional valence value(s), as shown in the areas for April 16$^{th}$ and April 27$^{th}$.

Figures 6V, 6W:
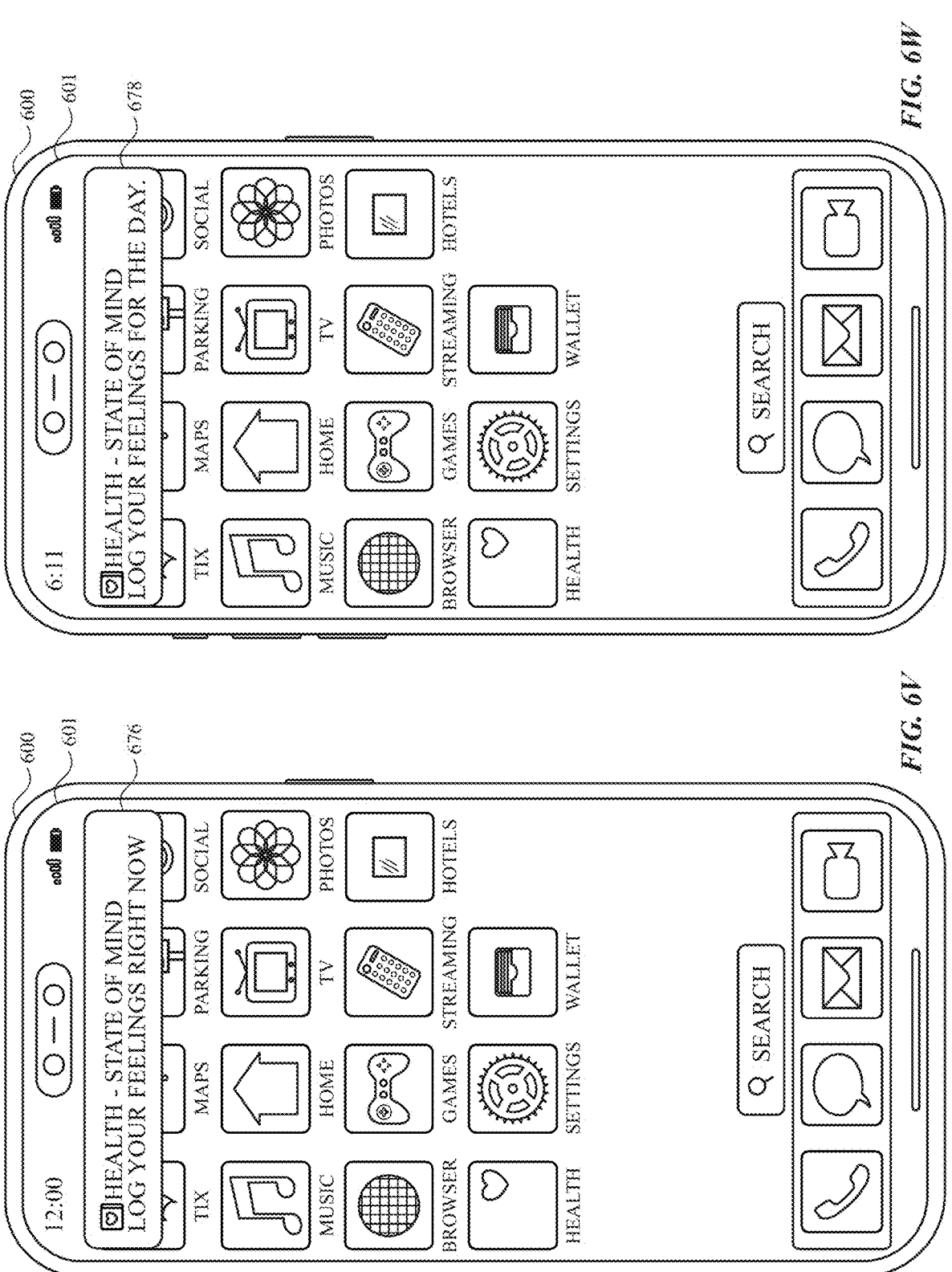

In FIG. 6U, device 600 displays reminder user interface 670. Reminder user interface 670 allows the user to choose whether to enable display of reminder 676 (FIG. 6V) at the middle of the day (e.g., 12 PM) to log emotional valence data and/or whether to enable display of reminder 678 (FIG. 6W) at the end of the day (e.g., 6 PM) to log emotional valence data. In particular, edit affordance 672 is selectable to allow the user to choose to display reminder 676, to display reminder 678, or to display both reminders 676 and 678. Confirmation affordance 674 is selectable to allow the user to confirm their choice, thereby enabling display of selected reminder 676 and/or 678 at an appropriate time. In FIG. 6V, device 600 displays reminder 676. Device 600 displays reminder 676 because the current time of 12 PM corresponds to the middle of the day and because device 600 received user input to enable display of reminder 676 in the middle of the day. In FIG. 6W, device 600 displays reminder 678. Device 600 displays reminder 678 because the current time of 6:11 PM corresponds to the end of the day and because device 600 received user input to enable display of reminder 678 at the end of the day.

Figures 6X, 6Y:
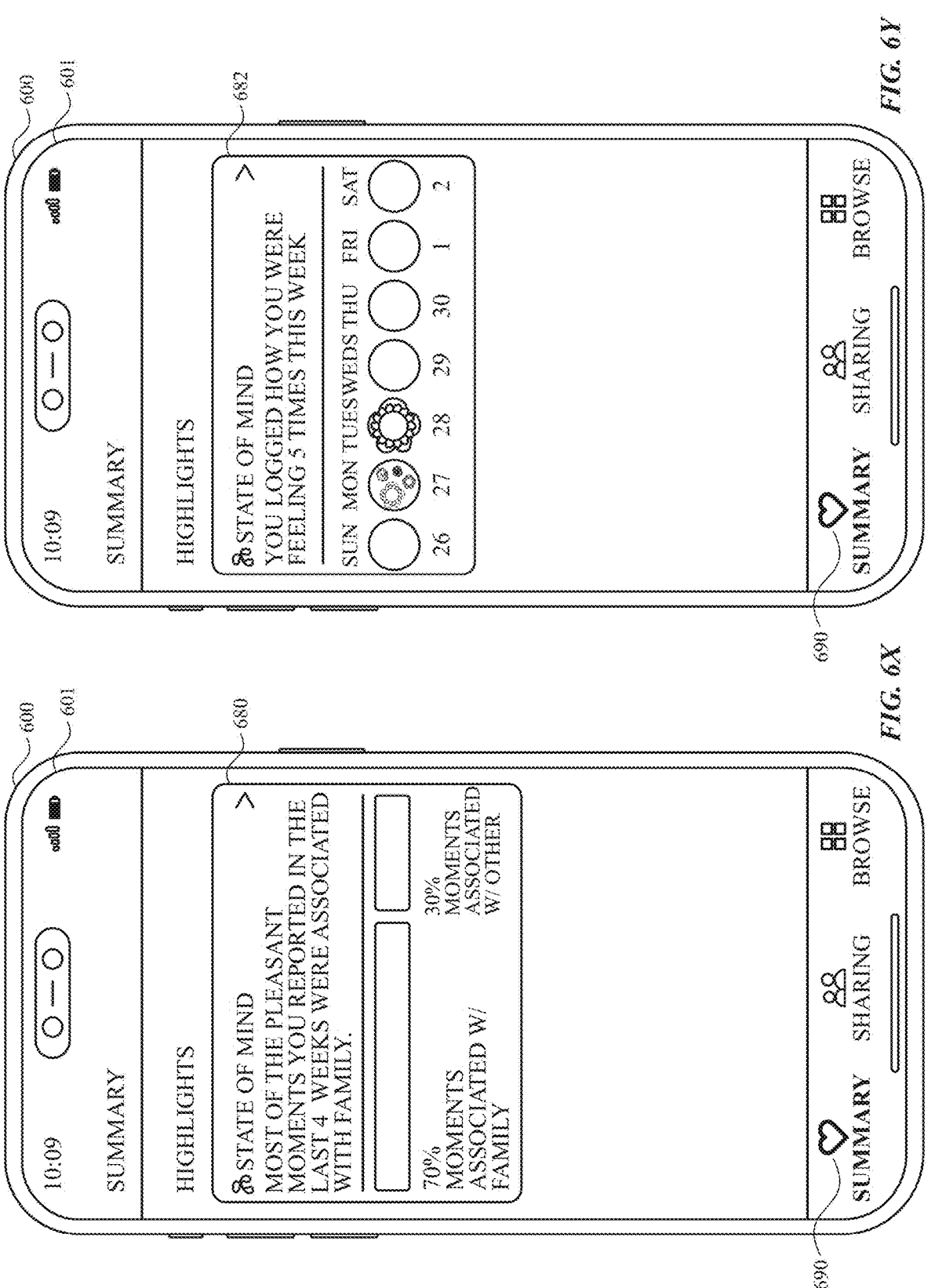
Figure 6Z:
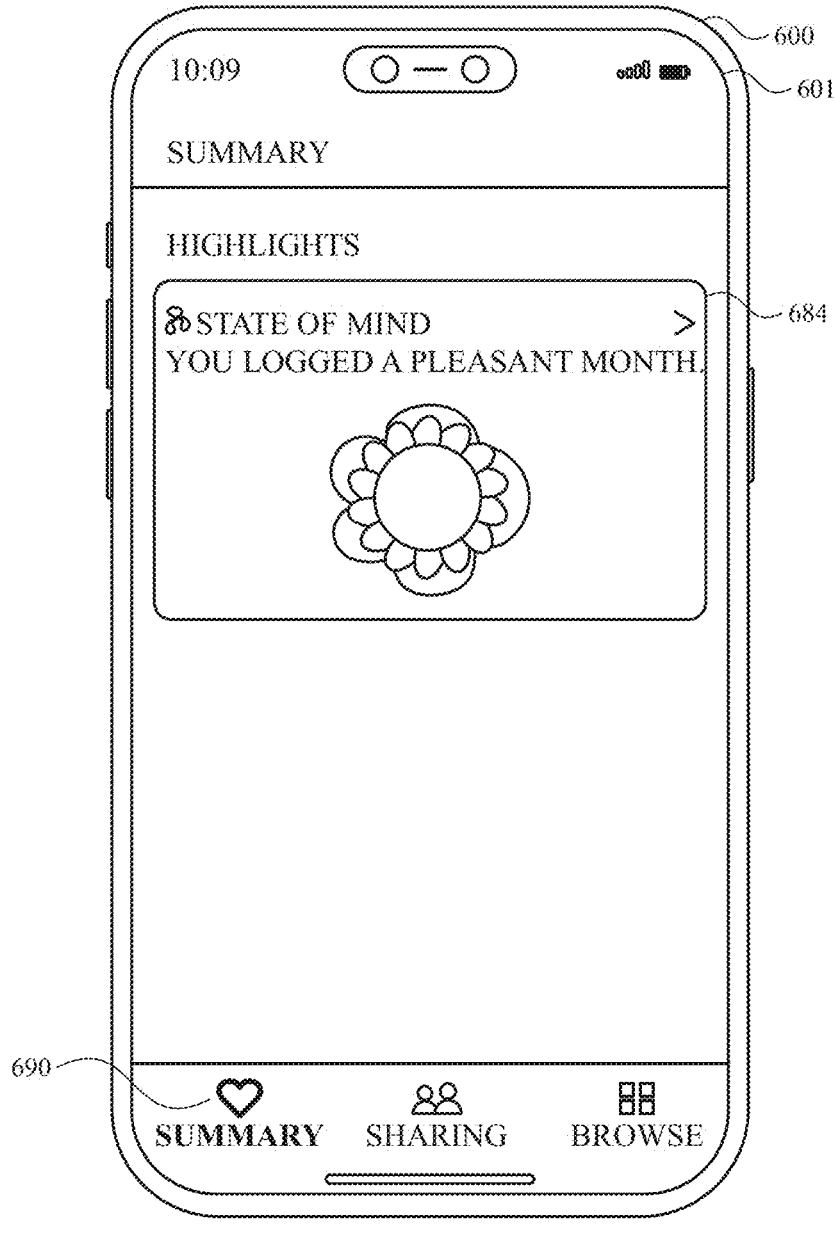

In FIGS. 6X-6Z, device 600 displays highlight cards 680, 682, and 684, respectively. Device 600 displays highlight cards 680, 682, and/or 684 when summary affordance 690 of the health application is selected (as indicated by the bolding of summary affordance 690). Generally, when summary affordance 690 is selected, device 600 displays one or more highlight cards that include information obtained by processing health data accessible to device 600. FIG. 6X illustrates one type of highlight card 680 including information obtained by processing logged emotional valence data. Highlight card 680 indicates that in the past four weeks, family is the association most often logged for pleasant (and/or very pleasant) emotional valence values. FIG. 6Y illustrates another type of highlight card 682 including information obtained by processing logged emotional valence data. Highlight card 682 indicates the number of times the user logged emotional valence values during the past week. FIG. 6Z illustrates yet another type of highlight card 684 including information obtained by processing logged emotional valence data. Highlight card 684 indicates that the current month is a pleasant month, e.g., as determined by averaging the emotional valence values logged for the current month.

In some embodiments, device 600 displays a prompt for the user to take a depression and/or anxiety assessment based on processing the emotional valence data logged for a particular time period, e.g., the past week, the past 30 days, the past month, and/or the past year. In some embodiments, device 600 displays the prompt in the form of a reminder affordance, e.g., similar to reminder affordances 676 and 678 in FIGS. 6V and 6W. In some embodiments, device 600 displays the prompt in the form of a highlight card displayed in the summary section of the health application, e.g., similar to highlight cards 680, 682, and 684 in FIGS. 6X-6Z. In some embodiments, in response to receiving a user input that selects the prompt, device 600 displays a user interface including questions for the anxiety and/or depression assessment. Based on a set of user inputs that answer the questions, device 600 provides (e.g., displays) the results of the depression and/or anxiety assessment, e.g., so the user can share the results with a healthcare provider. In some embodiments, the prompt additionally or alternatively includes link(s) to resource(s) (e.g., articles, suggestions, and/or tips) for managing depression and/or anxiety.

In some embodiments, device 600 displays the prompt in accordance with a determination that a set of one or more criteria is satisfied. In some embodiments, the set of one or more criteria includes a first criterion that is satisfied when least a predetermined number (e.g., over 5, over 10, or over 50) of emotional valence values logged over a time period (e.g., the past week, the past 30 days, the past month, the past 3 months, the past 6 months, and/or the past year) are less than a predetermined value (e.g., less than 40, meaning the values are unpleasant or very unpleasant) and/or when at least a predetermined percentage of (e.g., over 50%, over 60%, over 75%, or over 65%) of the emotional valence values are less than the predetermined value. In some embodiments, the processing to determine whether the first criterion is satisfied only considers the daily emotional valence values logged for the time period. For example, the first criterion is satisfied when the user logged at least 14 unpleasant or very unpleasant daily values over the past 30 days. In other embodiments, the processing to determine whether the first criterion considers both the daily emotional valence values and the momentary emotional valence values logged for the time period, or only considers the momentary emotional valence values logged for the time period. In some embodiments, the set of one or more criteria includes a second criterion that is satisfied when fewer than a predetermined number of (e.g., less than 5, 7, 10, or 15) the emotional valence values logged over the time period are greater than a predetermined value (e.g., greater than 60, meaning the values are pleasant or very unpleasant) and/or when less than a predetermined percentage of (e.g., less than 50%, less than 40%, less than 30%, or less than 25%) the logged values are greater than the predetermined value. Similar to the processing to determine whether the first criterion is satisfied, the processing to consider whether the second criterion is satisfied can consider only the daily emotional valence values logged for the time period, consider only the momentary emotional valence values logged for the time period, and/or consider both the daily and momentary emotional valence values logged for the time period. For example, the second criterion is satisfied when fewer than 7 daily emotional valence values logged over the past 30 days are pleasant or very pleasant. In some embodiments, as the user logs more emotional valence data, device 600 adjusts the specific criteria used to determine whether to display the prompt. For example, device 600 implements algorithm(s) configured to learn (e.g., predict) whether the emotional valence data logged over a time period may be indicative of depression and/or anxiety for the specific user of device 600. In this manner, device 600 can personalize the criteria used to display the prompt, so device 600 can present the prompt to the user under appropriate conditions.

FIG. 7 is a flow diagram illustrating a method for logging emotional valence data using a computer system, in accordance with some embodiments. Method 700 is performed at a computer system (e.g., 100, 300, 500, and/or 600) (e.g., a smartphone, a smart watch, a head-mounted device, a tablet device, a laptop computer, a desktop computer, or a smart home device) that is in communication with a display generation component (e.g., a display and/or a display controller) and one or more input devices (e.g., a touch sensitive surface, an image sensor, a microphone, and/or a rotatable input device). Some operations in method 700 are, optionally, combined, the orders of some operations are, optionally, changed, and some operations are, optionally, omitted.

As described below, method 700 provides an intuitive way for logging and interacting with emotional valence data. The method reduces the cognitive burden on a user for such logging and interaction, thereby creating a more efficient human-machine interface. For battery-operated computing devices, enabling a user to log and interact with emotional valence data faster and more efficiently conserves power and increases the time between battery charges.

The computer system displays (702), via the display generation component, a first user interface (e.g., 606 or 636) for logging emotional valence data (e.g., a user interface that enables a user to log data indicating their emotional state). In some embodiments, the emotional valence data includes one or more emotional valence values that are logged according to the techniques discussed herein. An emotional valence value describes the extent to which a user's emotion and/or state of mind is positive or negative. In some embodiments, each emotional valence value is a number, where a higher number represents a more positive (e.g., pleasant) emotional valence and a lower number represents a more negative (e.g., unpleasant) emotional valence. The first user interface includes: a shape (e.g., 609 or 637) (e.g., a 2-dimensional or 3-dimensional object) having a first appearance (e.g., the appearance of shape 609 in FIG. 6B or the appearance of shape 637 in FIG. 6L) representing a first emotional valence value. In some embodiments, the shape has a plurality of different pre-defined appearances that each represents a respective emotional valence value within a predefined allowed range of emotional valence values, e.g., integers from 0-100, inclusive. In some embodiments, the appearance is more symmetric (and/or has a different color scheme) for a high emotional valence value and less symmetric (and/or has a different color scheme) for a low emotional valence value. The first user interface includes first text (e.g., 610 or 640) describing a first range of emotional valence values, wherein the first range of emotional valence values includes the first emotional valence value. In some embodiments, the first text is a member of a predefined set of texts that each describe a respective predefined range of emotional valence values. For example, the predefined set of texts include "very unpleasant," "unpleasant," "neutral," "pleasant," and "very pleasant," where "very unpleasant" describes the range 0-20, "unpleasant" describes the range 21-40, "neutral" describes the range 41-60, "pleasant" describes the range 61-80, and "very pleasant" describes the range 81-100. In some embodiments, the first range of emotional valence values is a sub-range (e.g., 0-20, 21-40, 41-60, 61-80, or 81-100) of the predefined allowed range of emotional valence values, e.g., 0-100.

While displaying the first user interface for logging emotional valence data, the computer system detects (704), via the one or more input devices, a first user input (e.g., 611, 612, 613, 615, 638, or 639) that requests to change the first emotional valence value (e.g., a touch input, a gesture input, a rotational input, and/or a speech input).

In response to detecting the first user input, the computer system updates (706) the display of the first user interface. Updating the display of the first user interface includes: changing (708) the shape to have a second appearance (e.g., the appearance of shape 609 in FIG. 6C, 6D, 6E, or 6F, or the appearance of shape 637 in FIG. 6M or FIG. 6N) different from the first appearance (e.g., replacing the shape having the first appearance with the shape having the second appearance), wherein the second appearance represents a second emotional valence value different from the first emotional valence value. Updating the display of the first user interface includes: in accordance with a determination that the second emotional valence value is within (e.g., included in) a second range of emotional valence values that does not overlap with the first range of emotional valence values (e.g., the first range of emotional valence values and the second range of emotional valence values do not include any common emotional valence value), changing (710) the first text to second text (e.g., 614, 616, or 641) describing the second range of emotional valence values (e.g., replacing the first text with the second text). In some embodiments, the second text is a member of the predefined set of texts and describes a different range of emotional valence values than the first text. In some embodiments, the second range of emotional valence values is another sub-range of the predefined allowed range of emotional valence values. In some embodiments, the first range of emotional valence values is larger than or smaller than the second range of emotional valence values. In some embodiments, the first range of emotional valence values and the second range of emotional values have an equal size, e.g., each include the same number of emotional valence values. Updating the display of the first user interface includes: in accordance with a determination that the second emotional valence value is within (e.g., included in) the first range of emotional valence values, forgoing (712) changing the first text based on the first user input (e.g., forgoing replacing the first text with the second text and/or continuing to display the first text; maintaining the first text) (e.g., as illustrated by the transition between FIGS. 6B to 6C, FIGS. 6C to 6D, or FIGS. 6L to 6M). In response to the first user input, changing the appearance of the shape and conditionally changing the text (e.g., based on which range of emotional valence values the second emotional valence value is within) provides a more precise and less cumbersome input scheme for logging emotional valence data. Providing a more precise and less cumbersome input scheme for logging emotional valence data enhances the operability of the system and makes the user-system interface more efficient (e.g., by allowing the system to more precisely represent many possible emotional states via many possible appearances of the shape, by avoiding overwhelming the user and cluttering the user interface with an excessive amount of choices for text to describe the many possible emotional states, and by helping the user to provide proper inputs and reducing user mistakes when operating/interacting with the system), while also reducing power usage and improving battery life of the system by enabling the user to use the system more quickly and efficiently. Doing so also reduces the number of user inputs required to precisely log emotional valence data. Doing so also automatically performs an operation (e.g., changing the appearance of the shape and/or the text) when a set of conditions has been met without requiring further user input. Further, displaying the shape with different appearances provides a user with improved feedback about whether the system has accurately captured their emotional state.

In some embodiments, the first user input (e.g., 638 or 639) corresponds to movement of (e.g., rotation of) a rotatable input mechanism. In some embodiments, a first position of the rotatable input mechanism corresponds to the first emotional valence value and the movement of the rotatable input mechanism changes the first position to a second position of the rotatable input mechanism that corresponds to the second emotional valence value. In some embodiments, the second position is defined by an amount of rotation of the rotatable input mechanism relative to the first position. Moving a rotatable input mechanism to change the emotional valence value allows precise entry of the emotional valence value with a reduced number of user inputs, which allows the user to use the system more quickly and efficiently.

In some embodiments, the first user input corresponds to movement of a slider selectable graphical object (e.g., 607) (e.g., an affordance that changes position in response to user input that requests to move the affordance). In some embodiments, a first position (e.g., displayed location) of the slider affordance corresponds to the first emotional valence value and the movement of the slider affordance changes the first position to a second position (e.g., displayed location) of the slider affordance that corresponds to the second emotional valence value. In some embodiments, the slider affordance is confined to a predetermined set of positions, where each position in the predetermined set of positions corresponds to a different respective emotional valence value. Moving a slider affordance to change the emotional valence value allows precise entry of the emotional valence value with a reduced number of user inputs, which allows the user to use the system more quickly and efficiently.

In some embodiments, the first user interface includes a next graphical object (e.g., 617 or 642) selectable to proceed to a next step in logging the emotional valence data, and method 700 further includes: while displaying the first user interface, receiving, via the one or more input devices, a user input (e.g., 618 or 643) that selects the next graphical object; and in response to receiving the user input that selects the next graphical object, displaying, via the display generation component, a second user interface (e.g., 619 or 644) for logging the emotional valence data (e.g., a next user interface that allows the user to add more detail to the emotional valence data). The second user interface includes the shape having a current appearance representing a current emotional valence value. In some embodiments, the current appearance is the first appearance and the current emotional valence value is the first emotional valence value when the user input is received when the shape has the first appearance. In some embodiments, the current appearance is the second appearance and the current emotional valence value is the second emotional valence value when the user input is received while the shape has the second appearance. The second user interface further includes current text describing a respective range of emotional valence values. In some embodiments, the current text is the first text when the user input is received when the first user interface includes the first text. In some embodiments, the current text is the second text when the user input is received when the first user interface includes the second text. Displaying the current text and the shape with the current appearance in response to a user selection of the next affordance provides improved feedback that the system has accurately entered emotional valence data.

In some embodiments, the second user interface further includes a time graphical object (e.g., 620 or 645) indicating a first time value associated with (e.g., for) the current emotional valence value. In some embodiments, the first time value is a current time, e.g., the time when the user input that selects the next affordance is received. In some embodiments, the first time value is a time period, e.g., an entire day, an entire week, an entire month, or an entire year. Displaying the time affordance provides the user with improved feedback about a time associated with emotional valence data.

In some embodiments, method 700 further includes receiving, via the one or more input devices, a first set of one or more inputs including a user input that selects the time graphical object; and in response to receiving the first set of one or more inputs, modifying the time graphical object to indicate a second time value different from the first time value (e.g., as illustrated by the transition between FIG. 6G and FIG. 6H). In some embodiments, replacing the first time value with the second time value. In some embodiments, the second time value is a moment in time, e.g., 10:25 AM. In some embodiments, the second time value is a time period, e.g., an entire day, an entire week, an entire month, or an entire year. Modifying the time affordance in response to a set of user inputs provides the user with greater control over the system and to allows the user to more precisely describe the emotional valence data (e.g., by allowing the user to specify a time associated with the emotional valence data) without cluttering the user interface. Modifying the time affordance in response to a set of user inputs also provides the user with improved feedback that the system has correctly entered the time.

In some embodiments, the first time value (e.g., the time value in time affordance 620 in FIG. 6G) is a default time value that depends on when the user input that selects the next graphical object is received. In some embodiments, the default time value is the moment in time when the user input that selects the next affordance is received if the user input that selects the next affordance is received before a time representing an end of a day, e.g., 6 PM. In some embodiments, the default time value is a time period (e.g., an entire day) if the user input that selects the next affordance is received at or after the time representing the end of the day, e.g., received at or after 6 PM. Having the default time value depend on when the user input is received increases the chance that the default time value is a correct time value for the emotional valence data, which reduces the number of user inputs required to change the default time to a correct time.

In some embodiments, the second user interface further includes: a first association selectable graphical object (e.g., an association affordance of association affordances 621) that, when selected, associates a first association characteristic (e.g., family, friends, romance, career, pets, spirituality, finances, current events, politics, health, or dating) with the current emotional valence value; and a second association selectable graphical object (e.g., an association affordance of association affordances 621) that, when selected, associates a second association characteristic (e.g., family, friends, romance, career, pets, spirituality, finances, current events, politics, health, or dating) with the current emotional valence value, wherein the first and second association characteristics are different. In some embodiments, each selectable association affordance indicates a respective association characteristic (e.g., factor) that the user can select as contributing to the emotional state represented by the current emotional valence value. In some embodiments, the second user interface includes additional selectable association affordances. Displaying the plurality of selectable association affordances provides improved feedback about the association characteristics that can be logged for the emotional valence value and reduces the number of inputs the user provides to precisely describe the emotional valence value.

In some embodiments, the second user interface further includes: a first label selectable graphical object (e.g., a label affordance of label affordances 625) that, when selected, associates a first label characteristic (e.g., calm, mellow, chill, delighted, angry, happy, sad, frustrated, joyful, scared, nervous, accomplished, or proud) with the current emotional valence value; and a second label selectable graphical object (e.g., a label affordance of label affordances 625) that, when selected, associates a second label characteristic (e.g., calm, mellow, chill, delighted, angry, happy, sad, frustrated, joyful, scared, nervous, accomplished, or proud) with the current emotional valence value, wherein the first and second label characteristics are different. In some embodiments, each selectable label affordance indicates a respective label characteristic (e.g., description) that the user can select to describe to the emotional state represented by the current emotional valence value. In some embodiments, the second user interface includes additional selectable label affordances. Displaying the plurality of label affordances provides improved feedback about the label characteristics that can be logged for the emotional valence value and reduces the number of inputs the user provides to precisely describe the emotional valence value.

In some embodiments, the first and second label selectable graphical objects are displayed in an order that is based on the current emotional valence value. In some embodiments, when the current emotional valence value represents a positive emotional state (e.g., is above 50), selectable label affordances representing more positive emotions (e.g., happy, joyful, calm, and proud) are displayed at the top of a list of selectable label affordances and selectable label affordances representing more negative emotions (e.g., angry, sad, and frustrated) are displayed at the bottom of the list. In some embodiments, when the current emotional valence value represents a negative emotional state (e.g., is below 50), selectable label affordances representing more negative emotions are displayed at the top of the list and selectable label affordances representing more positive emotions are displayed at the bottom of the list. Ordering the selectable label affordances based on the current emotional valence value increases the chance the user selects the correct label characteristic(s) for the emotional valence value and helps the user select the correct label characteristic(s), which reduces the number of user inputs required to perform an operation.

In some embodiments, the second user interface further includes a graphical object (e.g., 624 or 648) selectable to allow entry of text (e.g., via a keyboard and/or via dictation) describing the current emotional valence value. Displaying the affordance selectable to allow entry of text provides improved feedback that the user can enter text to describe the emotional valence value and reduces the number of inputs the user provides to precisely describe the emotional valence value.

In some embodiments, the second user interface further includes a logging graphical object (e.g., 627 or 649). In some embodiments, method 700 further includes: receiving, via the one or more input devices, a user input (e.g., 628) that selects the logging graphical object; and in response to receiving the user input that selects the logging graphical object, logging (e.g., storing) the current emotional valence value, including: logging the current appearance of the shape; and logging the current text. In some embodiments, in response to receiving the user input that selects the logging affordance, logging, in association with the current emotional valence value: (1) the time value indicated by the time affordance when the user input is received, (2) the association characteristic(s) respectively indicated by the selected association affordance(s) when the user input is received, (3) the label characteristic(s) respectively indicated by the selected label affordance(s) when the user input is received, and/or (4) entered text describing the current emotional valence value. Logging the current appearance of the shape and the current text in response to a user input that selects the logging affordance reduces the number of user inputs required to precisely log emotional valence data and provides the user with greater control of the system without cluttering the user interface.

In some embodiments, method 700 further includes: displaying, via the display generation component, a first day graphical object (e.g., 650 or 654) representing a first day, wherein the first day graphical object includes: a first set of one or more shapes (e.g., 609 or 655) having respective appearances that represent a respective emotional valence value logged for the first day, wherein: in accordance with a determination that a first number of respective emotional valence values were logged for the first day, the first set of one or more shapes has the first number (e.g., 652 or 657) of shapes; and in accordance with a determination that a second number, different from the first number, of respective emotional valence values were logged for the first day, the first set of one or more shapes has the second number (e.g., 652 or 657) of shapes. In some embodiments, the day affordance further includes text describing a respective range of emotional valence values, where the respective range of emotional valence values includes one of the emotional valence values logged for the day. In some embodiments, the day affordance includes a first predefined area (e.g., a circle). In some embodiments, if an emotional valence value is logged for the entire day, the shape representing the emotional valence value occupies the entire first predefined area. In some embodiments, if an emotional valence value is logged for a moment in the day, the shape representing the emotional valence value is displayed within the first predefined area without occupying the entirety of the first predefined area. In some embodiments, if the emotional valence values logged for the day include both an emotional valence value logged for the entire day and one or more emotional valence values logged for respective moment(s) in the day, the shape representing the emotional valence value logged for the entire day occupies the first predefined area and the one or more shapes representing the one or more emotional valence values logged for the respective moment(s) are displayed within a second predefined area (e.g., a second circle) different from the first predefined area. In some embodiments, for each day, only one emotional valence value can be logged for the entire day, but multiple emotional valence values can be logged for respective moments of the day. Displaying the first day affordance provides the user with improved feedback about their emotional state logged for a particular day without cluttering the user interface.

In some embodiments, method 700 further includes: while displaying the first day graphical object, receiving, via the one or more input devices, a user input (e.g., 653) corresponding to the first day graphical object (e.g., a gesture input, e.g., a swipe gesture input); and in response to receiving the user input corresponding to the first day graphical object: in accordance with a determination that the user input corresponding to the first day graphical object includes movement in a first direction (e.g., left, right, up, down, forwards, or backwards), displaying, via the display generation component, a second day graphical object (e.g., 654) (in some embodiments, replacing the first day affordance with the second day affordance) representing a second day before the first day (e.g., the day immediately before the first day), wherein the second day graphical object includes a second set of one or more shapes (e.g., 655) having respective appearances that represent a respective emotional valence value logged for the second day; and in accordance with a determination that the user input on the first day affordance includes movement in a second direction different from the first direction (e.g., left, right, up, down, forwards, or backwards), displaying, via the display generation component, a third day graphical object (in some embodiments, replacing the first day affordance with the third day affordance) representing a third day after the first day (e.g., the day immediately after the first day), wherein the third day graphical object includes a third set of one or more shapes having respective appearances that represent a respective emotional valence value logged for the third day. Selectively displaying the second day affordance or the third day affordance based on a direction of the user input reduces the number of user inputs required to display emotional valence data for a day of interest. Doing so also provides greater control of the system without cluttering the user interface.

In some embodiments, method 700 further includes: while displaying the first day graphical object (e.g., 654), receiving, via the one or more input devices, a user input (e.g., 658) that selects the first day graphical object; and in response to receiving the user input that selects the first day graphical object, displaying, via the display generation component, a detail user interface (e.g., 659) for the first day, wherein the detail user interface includes: a second shape (e.g., 655-2, 655-3, or 655-4) having an appearance representing an emotional valence value logged for a moment (e.g., a singular point in time) of the first day; and a third shape (e.g., 655-1) having an appearance representing an emotional valence value logged for (e.g., associated with (e.g., rather than only being associated with a specific sub-segment of the day)) the entire first day (e.g., logged for time period that corresponds to the first day). In some embodiments, the detail user interface further includes text (e.g., "very unpleasant," "unpleasant," "neutral," "pleasant," or "very pleasant") corresponding to the second shape and text (e.g., "very unpleasant," "unpleasant," "neutral," "pleasant," or "very pleasant") corresponding to the third shape. In some embodiments, the detail user interface further includes association characteristic(s), label characteristic(s), a time value, and/or entered text logged in association with the emotional valence value logged for the moment of the day. In some embodiments, the first day affordance does not include some of, or all of, such information. In some embodiments, the detail user interface further includes association characteristic(s), label characteristic(s), a time value, and/or entered text logged in association with the emotional valence value logged for the entire day. In some embodiments the first day affordance does not include some of, or all of, such information. Displaying the detail user interface in response to receiving the user input that selects a day affordance provides the user with improved feedback in the form of more detailed information about their emotional valence data for the day. Doing so also provides additional control over the system (e.g., the ability to display detailed emotional valence data) without cluttering the user interface.

In some embodiments, method 700 further includes: displaying, via the display generation component, a calendar graphical object (e.g., 665); receiving, via the one or more input devices, a user input (e.g., 664) that selects the calendar graphical object; and in response to receiving the user input that selects the calendar graphical object, displaying, via the display generation component, a calendar (e.g., 668) that indicates, for a day of a month, a fourth set of one or more shapes having respective appearances that represent a respective emotional valence value logged for the day of the month. In some embodiments, the shape that represents an emotional valence value logged for the entire day is larger than each of the shape(s) that represent respective emotional valence value(s) logged for respective moment(s) of the day. Displaying the calendar in response to receiving the user input that selects the calendar affordance provides the user with improved feedback in the form of more detailed information about their emotional valence data over a time period. Doing so also provides additional control over the system (e.g., the ability to view emotional valence data over a time period) without cluttering the user interface.

In some embodiments, method 700 further includes: in accordance with a determination that a first set of one or more criteria is satisfied, wherein the first set of one or more criteria includes a first criterion that is satisfied when a current time is a first predetermined time (e.g., a time representing the middle of a day, e.g., 12 PM) displaying, via the display generation component, a first reminder (e.g., 676) to log emotional valence data. In some embodiments, the first set of one or more criteria includes a second criterion that is satisfied when a user-adjustable setting of the computer system specifies to display a reminder to log emotional valence data in the middle of the day. In some embodiments, in response to receiving a user input selecting the first reminder, the system displays the user interface of FIG. 6B that enables the user to log emotional valence data. In some embodiments, when the system receives user input to proceed to a next step in the logging process from the user interface of FIG. 6B, the default time value for the emotional valence data is a current time. Displaying the first reminder to log emotional valence data if the first set of criteria are satisfied allows more efficient use of the system to log emotional valence data at an appropriate time and reduces the number of inputs required to perform an operation (e.g., log emotional valence data).

In some embodiments, method 700 further includes: in accordance with a determination that a second set of one or more criteria is satisfied, wherein the second set of one or more criteria includes a second criterion that is satisfied when the current time is a second predetermined time different from the first predetermined time (e.g., a time representing the end of a day, e.g., 8 PM): displaying, via the display generation component, a second reminder (e.g., 678) to log emotional valence data. In some embodiments, the second set of one or more criteria includes a third criterion that is satisfied when a user-adjustable setting of the electronic device specifies to display a reminder to log emotional valence data at the end of the day. In some embodiments, in response to receiving a user input selecting the second reminder, the system displays the user interface of FIG. 6B that enables the user to log emotional valence data. In some embodiments, when the system receives user input to proceed to a next step in the logging process from the user interface of FIG. 6B, the default time value for the emotional valence data is the entire day. Displaying the second reminder to log emotional valence data if the second set of criteria is satisfied allows more efficient use of the system to log emotional valence data at an appropriate time and reduces the number of inputs required to perform an operation (e.g., log emotional valence data).

In some embodiments, method 700 further includes: displaying, via the display generation component, an information graphical object (e.g., 680, 682, or 684) including information obtained by processing (e.g., analyzing, summarizing, and/or organizing) logged emotional valence data. In some embodiments, emotional valence data includes emotional valence values, the appearances of shapes representing the logged emotional valence values, texts corresponding to the logged emotional valence values, time values, association characteristics, label characteristics, and/or entered text (e.g., entered via a keyboard and/or dictation). Displaying the information affordance provides the user with improved visual feedback about their emotional valence data.

In some embodiments, the information graphical object is displayed in a predetermined section (e.g., the section of the health application in FIGS. 6X-6Z) (e.g., a summary section, e.g., a section of the health application where information obtained by processing health data accessible to the computer system is displayed) of a health application of the computer system. Displaying the information affordance in the predetermined section of the health application allows the user to more efficiently view desired health information (e.g., emotional valence data) which reduces the number of inputs required to perform an operation, e.g., to cause display of desired health information.

In some embodiments, the information (e.g., the information in information affordance 682) indicates a frequency (e.g., the number of times a week, a month, or a year) with which the user has logged emotional valence data. Having the information indicate the frequency provides the user with improved visual feedback and reduces the number of inputs required to access desired health information.

In some embodiments, the information (e.g., the information in information affordance 680) indicates an association characteristic (e.g., a factor that contributes to an emotional state represented by an emotional valence value) for (e.g., associated with) a predetermined type of logged emotional valence value. In some embodiments, the predetermined type of logged emotional valence value is a positive (e.g., above a threshold number, such as 60) emotional valence value. In some embodiments, the information indicates the association characteristic that most often corresponds to positive logged emotional valence values, e.g., positive logged emotional valences values logged during a predetermined time period, such as the past week, past month, or past year. For example, the information is "most of your logged pleasant moments in the last week are associated with family." Having the information indicate the association for the predetermined type of logged emotional valence value provides the user with improved visual feedback and reduces the number of inputs required to access desired health information.

In some embodiments, the information (e.g., the information in information affordance 684) indicates an aggregated value (e.g., average value) for emotional valence values logged during a predetermined time period (e.g., a week, a month, or a year). In some embodiments, the aggregated value is represented by text (e.g., very unpleasant, unpleasant, neutral, pleasant, or very pleasant) describing a range of emotional valence values, where the aggregated value is within the range. For example, the text is "a pleasant month" or a "very unpleasant week." Having the information indicate the aggregated value provides the user with improved visual feedback and reduces the number of inputs required to access desired health information.

Note that details of the processes described above with respect to method 700 (e.g., FIG. 7) are also applicable in an analogous manner to the methods described below. For example, method 900 optionally includes one or more of the characteristics of the various methods described above with reference to method 700. For example, the emotional valence values indicated by the chart displayed by method

900 can be logged according to method 700. For brevity, these details are not repeated below.

FIGS. 8A-8H illustrate exemplary user interfaces for interacting with emotional valence data, in accordance with some embodiments. The user interfaces in these figures are used to illustrate the processes described below, including the processes in FIG. 9.

Figure 8B:
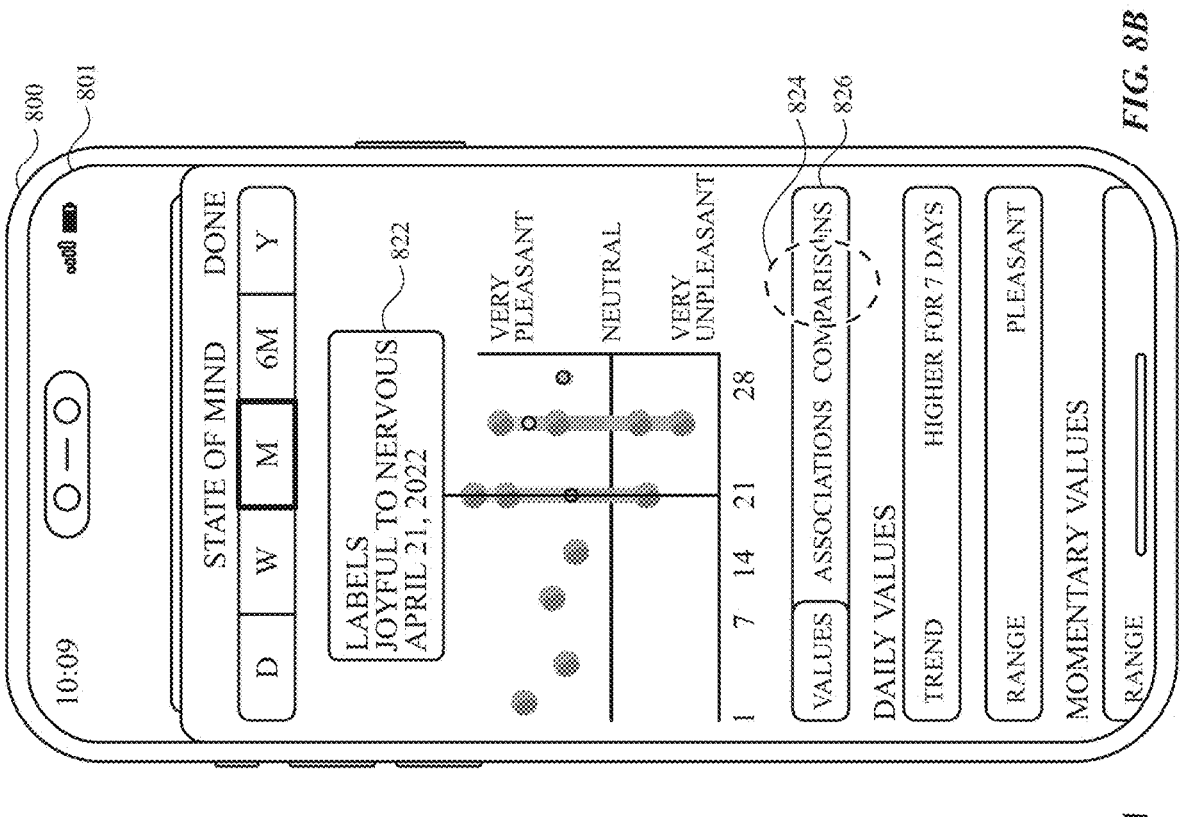
FIGS. 8A-8H illustrate exemplary user interfaces for interacting with emotional valence data, in accordance with some embodiments.
Figure 8A:
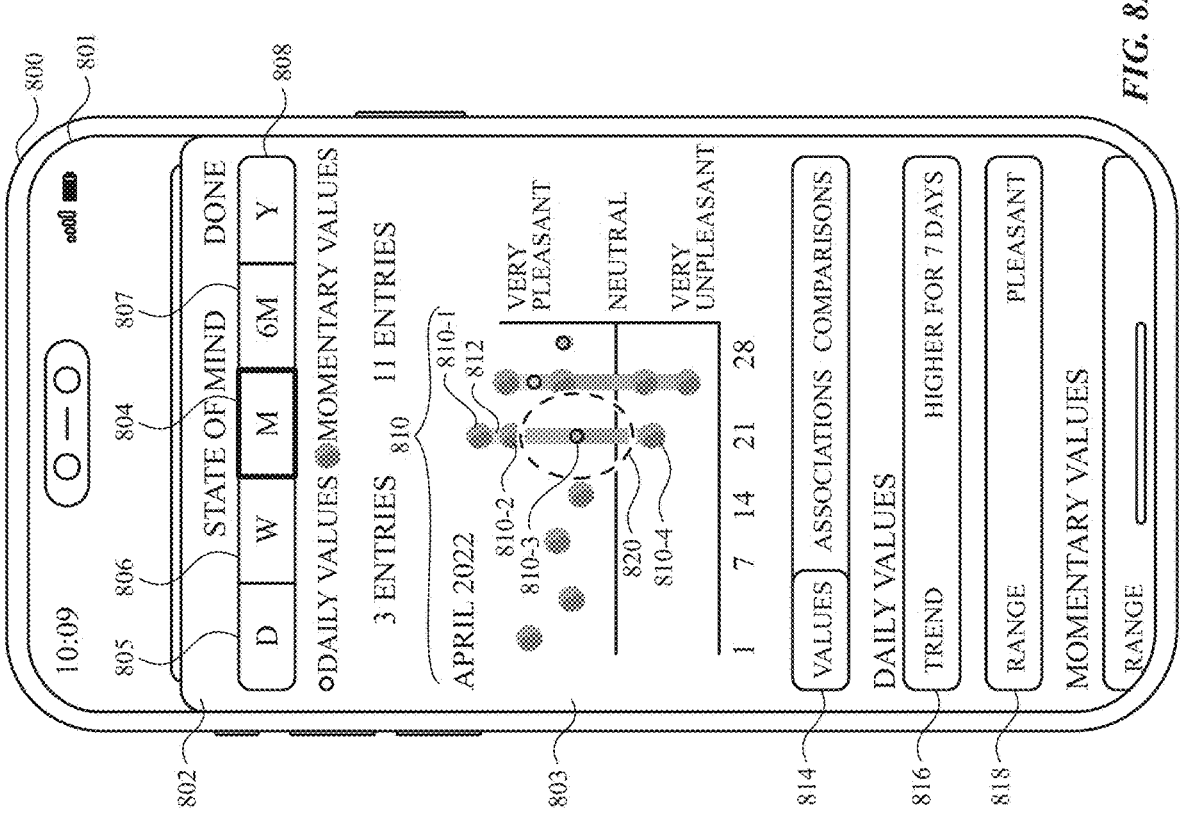

In FIG. 8A, device 800 displays health application user interface 802 on display 801. Device 800 is implemented as device 100, device 300, or device 500. In the illustrated embodiments, device 800 is implemented as a smartphone device. In other embodiments, device 800 is implemented as another type of device, such as a head mounted device (e.g., a headset or smart glasses), a smart watch, a tablet device, a laptop computer, a desktop computer, a smart speaker, or a smart home device.

Heath application user interface 802 includes chart 803 that indicates a plurality of emotional valence values logged for the current month of April 2022. Device 800 displays chart 803 for the current month of April 2022 because month affordance 804 is selected (as indicated by the bolded border around it). Health application user interface 802 further includes day affordance 805, week affordance 806, 6-month affordance 807, and year affordance 808. In response to receiving user input that selects day affordance 805, week affordance 806, 6-month affordance 807, or year affordance 808, device 800 displays a chart that indicates emotional valence value(s) logged for the current day, the current week (e.g., the past 7 days), the current 6-month period (e.g., the past 6 months), or the current year (e.g., the past year), respectively.

Chart 803 includes indications 810 of emotional valence values logged for April 2022. The y-axis of chart 803 indicates the emotional valence value and ranges from 1-100, where "very unpleasant" describes the range 1-20, "unpleasant" (not shown) describes the range 21-40, "neutral" describes the range 41-60, "pleasant" (not shown) describes the range 61-80, and "very pleasant" describes the range 81-100. The horizontal line extending from the text "neutral" in chart 803 corresponds to an emotional valence value of 50. The x-axis of chart 803 indicates the day for which the corresponding emotional valence value(s) were logged.

Chart 803 displays indications of emotional valence values logged for a moment of a day (i.e., momentary values) (e.g., indications 810-1, 810-2, and 810-4) with a first visual appearance and displays indications of emotional valence values logged for an entire day (i.e., daily values) (e.g., indication 810-3) with a different second visual appearance. In FIG. 8A, device 800 displays that 3 daily values have been logged for April 2022 and that 11 momentary values have been logged for April 2022.

In FIG. 8A, chart 803 includes bar 812 that represents emotional valence values logged for the day of Apr. 21, 2022. Bar 812 shows a range of emotional valence values logged for the day. Specifically, bar 812 includes indication 810-4 of the minimum emotional valence value logged for the day (i.e., an emotional valence value of 30) and indication 810-1 of the maximum emotional valence value logged the day (i.e., an emotional valence value of 90). Bar 812 further includes indication 810-3 of the daily value logged for the day and indication 810-2 of a momentary value logged for the day.

In FIG. 8A, device 800 displays chart 803 while values view affordance 814 is selected (as indicated by the border around it). When values view affordance 814 is selected, device 800 displays information affordances 816 and 818 that each include information obtained by processing at least some of the emotional valence values currently indicated by chart 803. In particular, information affordance 816 indicates that the daily values logged during the past 7 days are trending higher and information affordance 818 indicates that the daily values logged for the month of April 2022 fall within the range described by the text "pleasant." In some embodiments, in response to receiving user input that requests to scroll down health application user interface 802 while values view affordance 814 is selected, device 800 displays further information affordances that include analogous information obtained by processing the momentary values of chart 803.

In FIG. 8A, device 800 receives touch input 820 (e.g., a tap) that selects bar 812. In some embodiments, touch input 820 (and/or other inputs discussed in FIGS. 8A-8H) is another type of input, such as speech input, keyboard input, mouse input (or other hardware pointer device input), a gesture made with hand (e.g., that is detected via one or more cameras or other image sensors), or a gaze-based input. In FIG. 8B, in response to receiving touch input 820, device 800 displays label affordance 822 that indicates labels logged for the emotional valence values logged for the day of Apr. 21, 2022. In the illustrated embodiment, label affordance 822 indicates all of the labels ("joyful" and "nervous") that were logged for the emotional valence values logged for the day. In other embodiments, label affordance 822 indicates label(s) logged for the minimum emotional valence value of the day and/or indicates label(s) logged for the maximum emotional valence value of the day.

Figures 8C, 8D:
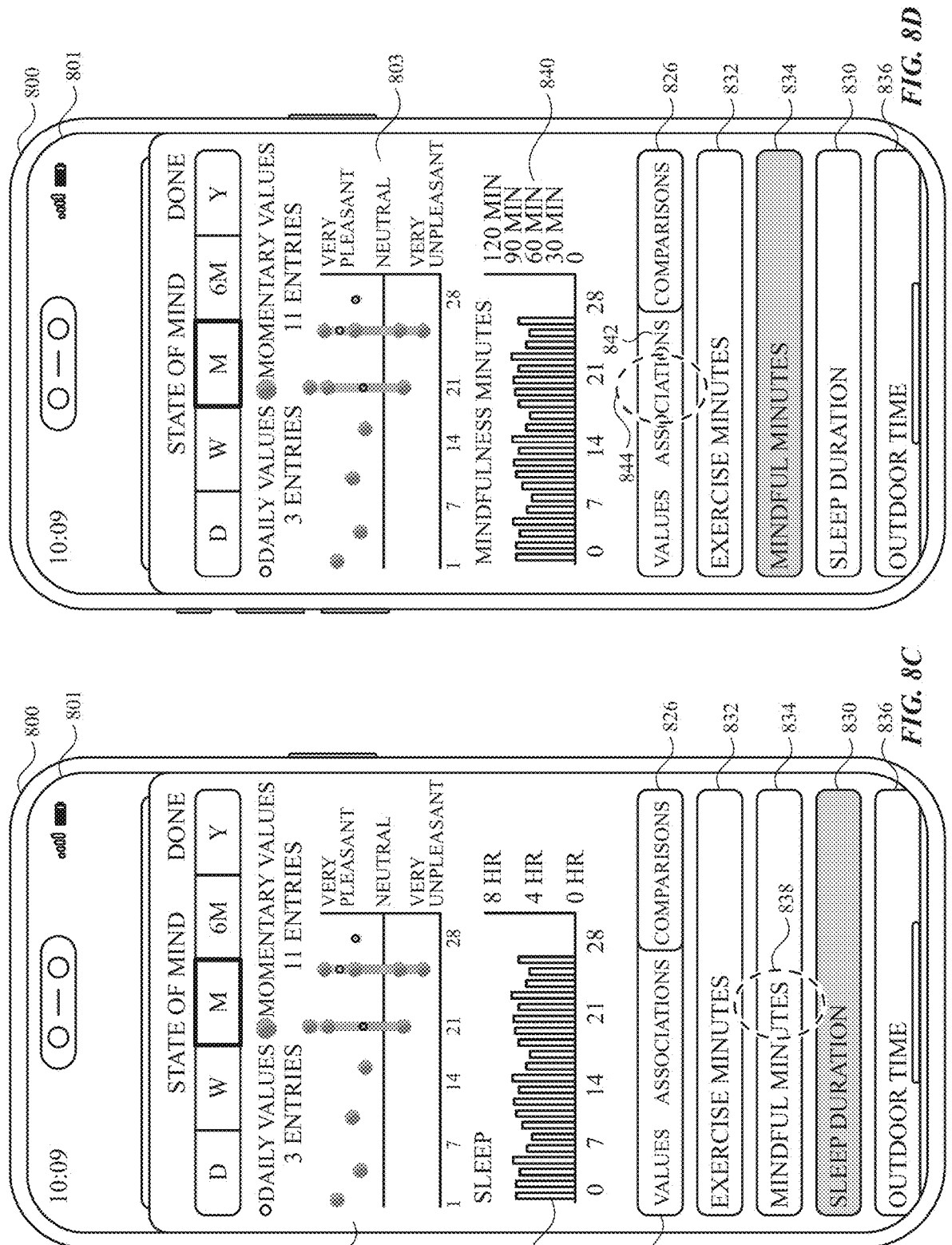

In FIG. 8B, device 800 receives touch input 824 that selects comparisons view affordance 826. In FIG. 8C, in response to receiving touch input 824, device 800 displays comparisons view affordance 826 as selected (as indicated by the border around it), unselects values view affordance 814, and displays chart 803 concurrently with chart 828 for sleep data obtained for the month of April 2022, thereby allowing comparison between emotional valence data and sleep data. Device 800 displays chart 803 concurrently with chart 828 for sleep data because sleep duration affordance 830 is selected (as indicated by the shading of sleep duration affordance 830) when comparisons view affordance 826 is selected. In FIG. 8C, when comparisons view affordance 826 is selected, device 800 further displays exercise minutes affordance 832, mindful minutes affordance 834, and outdoor time affordance 836.

In FIG. 8C, device 800 receives touch input 838 that selects mindful minutes affordance 834. In FIG. 8D, in response to receiving touch input 838, device 800 displays mindful minutes affordance 834 as selected (as indicated by the shading of mindful minutes affordance 834), unselects sleep duration affordance 830, and displays chart 803 concurrently with chart 840 for mindful minutes data obtained for the month of April 2022. In some embodiments, in response to receiving a user input that selects exercise minutes affordance 832 or outdoor time affordance 836, device 800 displays chart 803 concurrently with a chart for exercise minutes for April 2022 or a chart for outdoor time for April 2022, respectively.

Figures 8E, 8F:
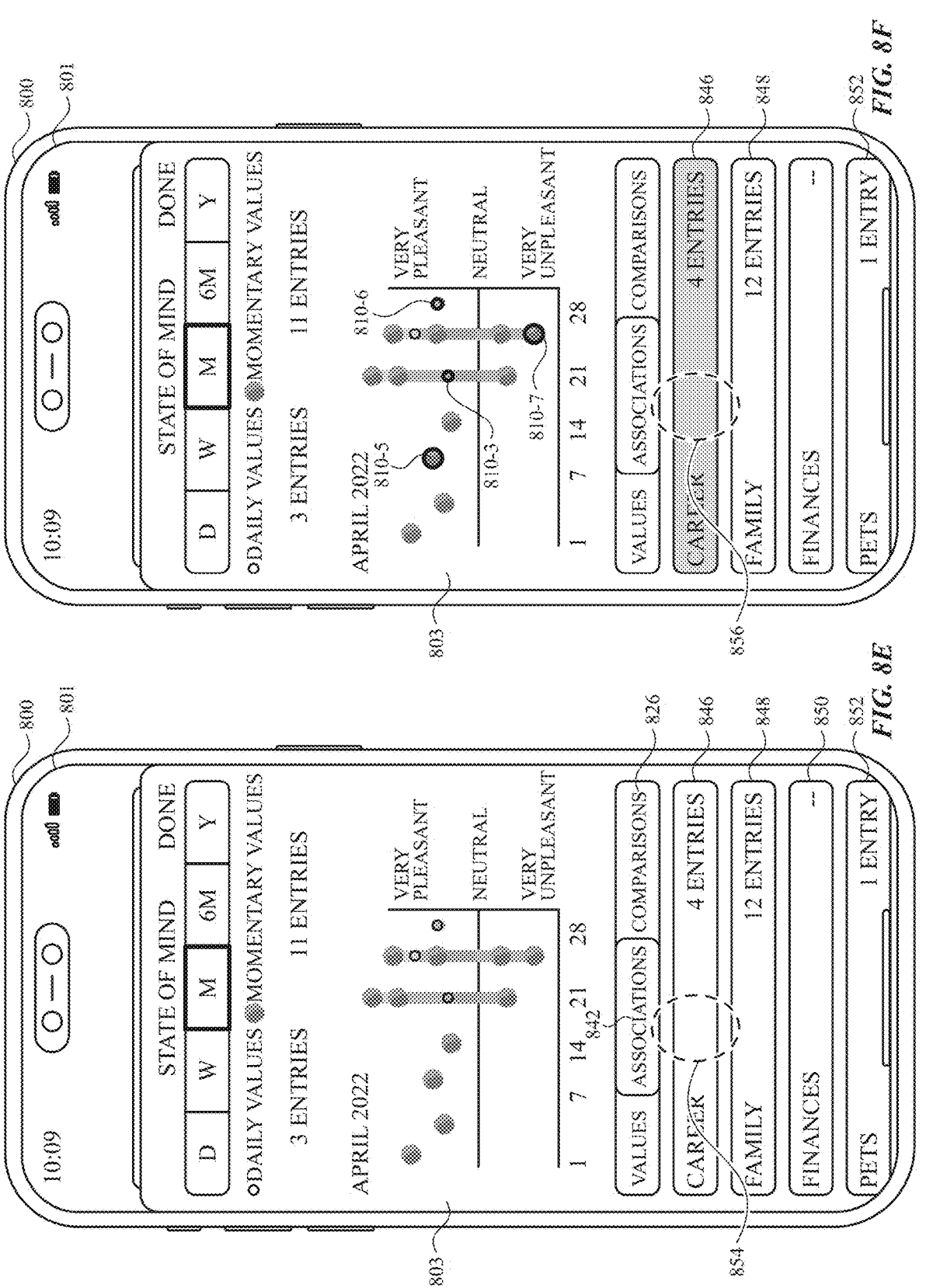

In FIG. 8D, device 800 receives touch input 844 that selects associations view affordance 842. In FIG. 8E, in response to receiving touch input 844, device 800 displays associations view affordance 842 as selected (as indicated by the border around it), unselects comparisons view affordance 826, and displays filtering affordances 846, 858, 850, and 852 concurrently with chart 803. Filtering affordance 846 indicates that the association "career" has been logged for 4 of the emotional valence values of chart 803. Filtering affordance 848 indicates that the association "family" has been logged for 12 of the emotional valence values of chart 803. Filtering affordance 850 indicates that the association "finances" has not been logged for any of the emotional valence values of chart 803. Filtering affordance 852 indicates that the association "pets" has been logged for 1 of the emotional valence values of chart 803.

In FIG. 8E, device 800 receives touch input 854 that selects filtering affordance 846. In FIG. 8F, in response to receiving touch input 854, device 800 displays filtering affordance 846 as selected (as indicating by the shading of filtering affordance 846) and emphasizes the display of indications 810-3, 810-5, 810-6, and 810-7 in chart 803 by displaying a bolded border around each of indications 810-3, 810-5, 810-6, and 810-7. Each of indications 810-3, 810-5, 810-6, and 810-7 is for a respective emotional valence value for which the association "career" was logged. In this manner, filtering affordance 846 allows the user to filter the emotional valence values of chart 803 to emphasize the particular emotional valence values associated with "career." It will be appreciated that selection of filtering affordance 848 or of filtering affordance 852 causes device 800 to filter the emotional valence values by the association "family" or by the association "pets", respectively, in an analogous manner.

Figures 8G, 8H:
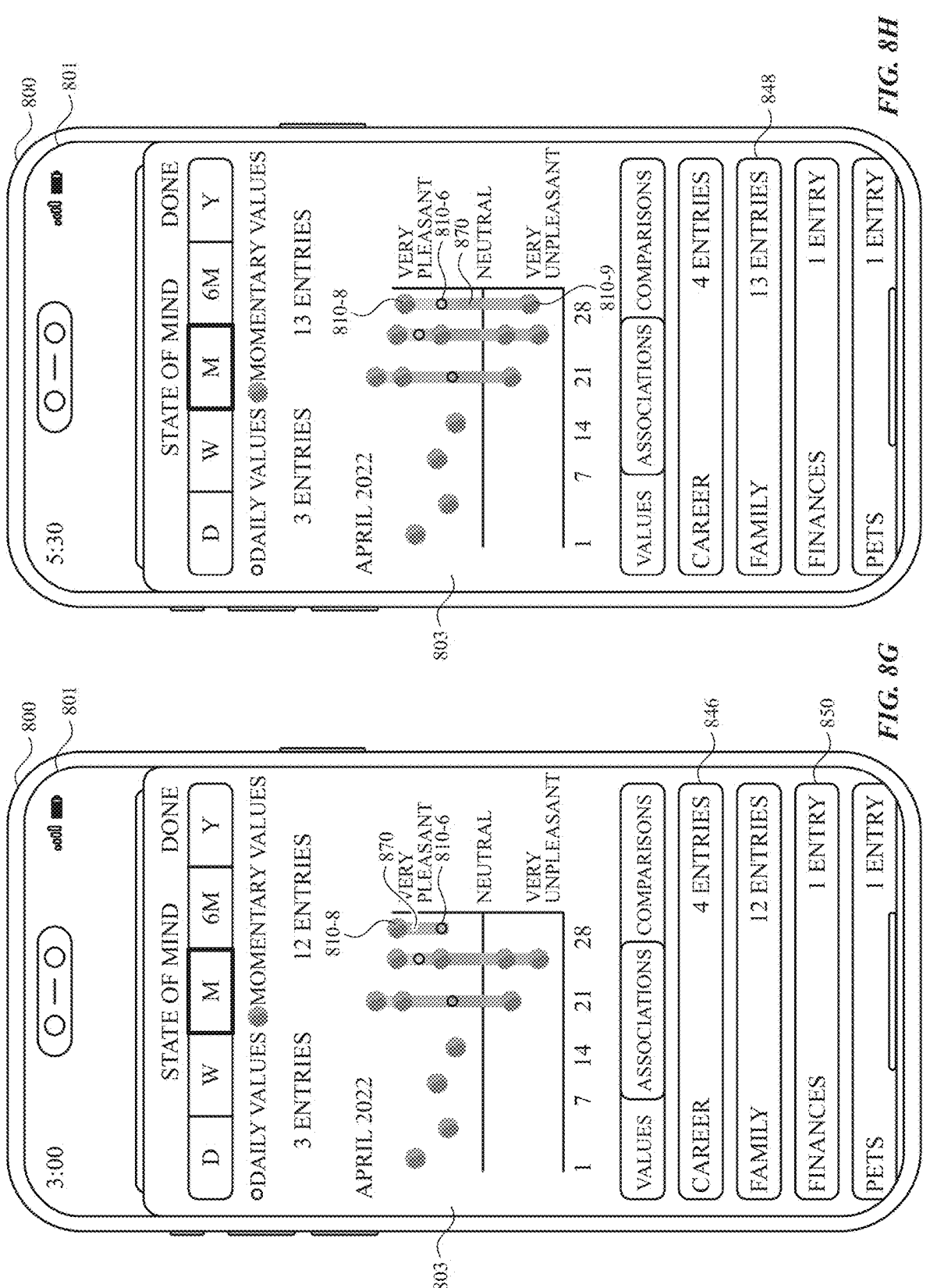

In FIG. 8F, device 800 receives touch input 856 that selects filtering affordance 846. In FIG. 8G, in response to receiving touch input 856, device 800 unselects filtering affordance 846 and ceases to emphasize the display of indications 810-3, 810-5, 810-6, and 810-7, thereby ceasing to filter the emotional valence values by the association "career."

In FIG. 8G, at a time later than that of FIG. 8F, device 800 has received a set of inputs to log a very pleasant momentary value for Apr. 28, 2022 and to log the association "finances" for the very pleasant momentary value. Device 800 logged the very pleasant momentary value according to the techniques discussed above with respect to FIGS. 6A-6P. New indication 810-8 in chart 803 indicates the new very pleasant momentary value. In FIG. 8F, device 800 now displays bar 870 that represents the emotional valence values logged for Apr. 28, 2022. Bar 870 includes new indication 810-8 and indication 810-6 for the daily emotional valence value.

In FIG. 8F, device 800 updates filtering affordance 850 to indicate that, due to the addition of the new very pleasant momentary value, the association "finances" has been logged for one of the emotional valence values in chart 803. Device 800 further updates the displayed content to indicate that 12 momentary values have been logged for April 2022.

In FIG. 8H, at a time later than that of FIG. 8G, device 800 has received a set of inputs to log a very unpleasant momentary value for Apr. 28, 2022 and to log the association "family" for the very unpleasant momentary value. Device 800 logged the very unpleasant momentary value according to the techniques discussed above with respect to FIGS. 6A-6P. New indication 810-9 in chart 803 indicates the new very unpleasant momentary value. In FIG. 8H, device 800 updates filtering affordance 848 to indicate that, due to the addition of the new very unpleasant momentary value, the association "family" has been logged for 13 emotional valence values in chart 803. Device 800 further updates the displayed content to indicate that 13 momentary values have been logged for April 2022.

In FIGS. 8F-8H, the daily value logged for the day of Apr. 28, 2022 does not depend on the momentary values logged for the day, e.g., is not based on an average of the momentary values. Specifically, in FIG. 8G and FIG. 8H, as device 800 logs the momentary values indicated by indications 810-8 and 810-9, the location of indication 810-6 for the daily value relative to the y-axis of chart 803 does not change (meaning that the daily value for the day does not change as new momentary values for the day are logged). In this manner, a user can independently log a daily value that describes the entire day, without having momentary value(s) logged for the same day affect the daily value.

FIG. 9 is a flow diagram illustrating a method for interacting with emotional valence data using a computer system, in accordance with some embodiments. Method 900 is performed at a computer system (e.g., 100, 300, 500, and/or 800) (e.g., a smartphone, a smart watch, a head-mounted device, a tablet device, a laptop computer, a desktop computer, or a smart home device) that is in communication with a display generation component (e.g., a display and/or a display controller. Some operations in method 900 are, optionally, combined, the orders of some operations are, optionally, changed, and some operations are, optionally, omitted.

As described below, method 900 provides an intuitive way for logging and interacting with emotional valence data. The method reduces the cognitive burden on a user for such logging and interaction, thereby creating a more efficient human-machine interface. For battery-operated computing devices, enabling a user to log and interact with emotional valence data faster and more efficiently conserves power and increases the time between battery charges.

The computer system displays (902) via the display generation component, a first chart (e.g., 803) indicating a plurality of emotional valence values logged for a time period (e.g., a day, a week, multiple weeks, a month, multiple months, a year, or multiple years). In some embodiments, the emotional valence values are each logged according to the techniques described above with respect to FIGS. 6A-6P. The first chart includes (904) a user interface object (e.g., 812 and/or 870) representing a sub-time period of the time period (e.g., another time period of a lesser duration than the time period, such as a sub-period (e.g., 12 hours) of a day, a day, a week, or a month). The user interface object includes (906) a first indication (e.g., 810-1, 810-2, 810-4, 810-8, and/or 810-9) (e.g., a first user interface object, such as an icon and/or a shape) of a first emotional valence value of the plurality of emotional valence values, wherein the first emotional valence value is for (e.g., represents, corresponds to, and/or is specific to) a moment (e.g., a singular point in time, such as 12:30 AM or PM; a first sub-portion of the sub-time period) within the sub-time period. In some embodiments, the first emotional valence value does not correspond to/represent a different, second sub-portion of the sub-time period. The user interface object includes (908) a second indication (e.g., 810-3 and/or 810-6) (e.g., a second user interface object, such as an icon and/or a shape) of a second emotional valence value of the plurality of emotional valence values, wherein the second emotional valence value is different from the first emotional valence value, and wherein the second emotional valence value is for (e.g., represents, corresponds to, and/or is specific to) the entire sub-time period (e.g., a single emotional valence value that represents a user's emotional state for the entire sub-time period). In some embodiments, for each sub-time period, the system allows the user to log only a single emotional valence value (e.g., a daily value) for the entire sub-time period but allows the user to log any number of emotional valence values for different moments (e.g., momentary value(s) during the day) within the sub-time period. Thus, in some embodiments, the user interface object includes only one indication of an emotional valence value for the entire sub-time period. In some embodiments, the first emotional valence value is of a first type (e.g., a momentary value) and the second emotional valence value is of a second type (e.g., a daily value) different from the first type. Displaying a chart including a user interface object that indicates both an emotional valence value logged for a moment within a sub-time period and emotional valence value logged for the entire sub-time period provides the user with improved visual feedback about the emotional valence values logged for the sub-time period. Displaying the chart as described also reduces the number of user inputs otherwise required to access both types of emotional valence values logged for the sub-time period. In this manner, the user-system interface is made more efficient (e.g., by reducing user mistakes when operating/interacting with the system), which also reduces power usage and improves battery life of the system by enabling the user to use the system more quickly and efficiently.

In some embodiments, the first indication (e.g., 810-1, 810-2, 810-4, 810-8, and/or 810-9) has a first appearance (e.g., is a filled in circle, has a predetermined size, and/or has a predetermined shape) and the second indication (e.g., 810-3 and/or 810-6) has a second appearance (e.g., is a not filled in circle, has a different predetermined size, and/or has a different predetermined shape) different from the first appearance. Displaying the indications with the different appearances provides improved visual feedback about the type of emotional valence value each indication represents and reduces the number of user inputs otherwise required to distinguish between the different types of emotional valence values.

In some embodiments, the user interface object (e.g., 812 and/or 870) (e.g., a bar or a rectangle) shows a range (e.g., the minimum and maximum) of emotional valence values logged for the sub-time period, wherein the emotional valence values logged for the sub-time period include the first emotional valence value and the second emotional valence value. In some embodiments, the chart includes a plurality of user interface objects (e.g., a plurality of bars) that each represent a respective sub-time period of the time period and that each show a respective range of the emotional valence values logged for the respective sub-time period. In some embodiments, the user interface object shows the range by a top of the user interface object representing the maximum emotional valence value and by the bottom of the user interface object representing the minimum emotional valence value. In some embodiments, the top of the user interface object has a first color and the bottom of the user interface object has a different second color. In some embodiments, the color of the user interface object transitions in a continuous manner (e.g., gradually) from the top to the bottom, e.g., from the first color to the second color. Showing the range of emotional valence values logged for the sub-time period provides the user with improved visual feedback about relevant emotional valence data and reduces the number of user inputs otherwise required to access such data.

In some embodiments, the second emotional valence value is not based on an average of one or more momentary emotional valence values (e.g., emotional valence values logged for respective moments, e.g., as opposed to emotional valence values logged for an entire time period or sub-time period) logged for the sub-time period, the one or more momentary emotional valence values including the first emotional valence value. Having the second emotional valence value that is not based on an average of one or more momentary emotional valence values provides the user with greater control of the system by allowing a user to log the second emotional valence value for an entire sub-time period (e.g., day) while preventing other logged emotional valence value(s) for the sub-time period from changing the second emotional valence value.

In some embodiments, method 900 further includes: concurrently displaying, via the display generation component, the first chart with a selected comparisons view graphical object (e.g., 826) (e.g., an affordance, that when selected, causes a chart for another type of health data to be displayed concurrently with the chart indicating the plurality of emotional valence values to allow comparison of the two charts); and while concurrently displaying the first chart with the selected comparisons view graphical object, displaying, via the display generation component, a second chart (e.g., 828) for a first type of health data (e.g., exercise minutes, mindful minutes (e.g., minutes spent performing meditation and/or other mindfulness activities), sleep duration, or outdoor time) that is predetermined to (e.g., preselected by the designer of the system to) correspond to emotional valence data. In some embodiments, the second chart indicates values for the first type of health data over a time period and the first chart indicates the plurality of emotional valence values logged for the same time period. Concurrently displaying the first chart with the second chart provides improved visual feedback that allows comparison between emotional valence data and another type of health data relevant to emotional health. Doing so also reduces the number of user inputs otherwise required to compare the data.

In some embodiments, method 900 further includes: while concurrently displaying the first chart and the second chart, receiving, via the one or more input devices, a user input (e.g., 838) that requests to switch the second chart to a third chart (e.g., 840) for a second type of health data (e.g., exercise minutes, mindful minutes, sleep duration, or outdoor time) different from the first type of health data, wherein the second type of health data is predetermined to correspond to the emotional valence data; and in response to receiving the user input that requests to switch the second chart to the third chart, concurrently displaying, via the display generation component, the first chart (e.g., 803) with the third chart (e.g., 840). In some embodiments, ceasing to display the second chart. In some embodiments, the third chart indicates values for the second type of health data over the same time period. In some embodiments, the user input corresponds to a selection of a health data type affordance for the second type of health data. In some embodiments, when the first chart and the second chart are concurrently displayed, another health data type affordance for the first type of health data is displayed in a selected state. Switching the second chart to the third chart in response to the user input provides improved visual feedback that allows comparison between emotional valence data and another type of health data relevant to emotional health. Doing so also performs an operation when a set of conditions have been met without requiring further user input and provides additional control of the system without cluttering the user interface.

In some embodiments, method 900 further includes: concurrently displaying, via the display generation component, the first chart with a selected filtering view graphical object (e.g., 842) (e.g., an affordance that when selected, causes display of a user interface that allows a user to filter the emotional valence values based on association characteristics or label characteristics for the emotional valence values); and while concurrently displaying the first chart with the selected filtering view graphical object, displaying, via the display generation component: a first filtering selectable graphical object (e.g., 846, 848, 850, and/or 852) that indicates a first characteristic (e.g., a label characteristic) and that when selected, filters the plurality of emotional valence values based on the first characteristic (e.g., emphasizes the respective indication(s), in the first chart, of the emotional valence value(s) associated with the first characteristic); and a second filtering selectable graphical object (e.g., 846, 848, 850, and/or 852) that indicates a second characteristic (e.g., a label characteristic) different from the first characteristic and that when selected, filters the plurality of emotional valence values based on the second characteristic. In some embodiments, the first and second filtering affordances are displayed when the filtering view affordance is selected and the first and second filtering affordances are not displayed when the filtering view affordance is not selected. In some embodiments, each filtering affordance represents a different label that was logged for at least one emotional valence value of the plurality of emotional valence values. In some embodiments, selection of a filtering affordance representing a particular label causes modification (e.g., filtering) of the first chart to emphasize (e.g., change the color and/or size of) the respective indication(s) of the emotional valence value(s) that the particular label is for, and optionally, further modification of the first chart to de-emphasize (e.g., change the color and/or size of) the respective indication(s) of the emotional valence value(s) that the particular label is not for. In some embodiments, when the selectable filtering view affordance is displayed, additional filtering affordances are displayed. Concurrently displaying the first chart with the plurality of filtering affordances provides improved visual feedback that the emotional valence values can be filtered according to relevant data.

In some embodiments, the first characteristic is a first association characteristic logged for (e.g., in association with) a third emotional valence value of the plurality of emotional valence values; and the second characteristic is a second association characteristic, different from the first association characteristic, logged for a fourth emotional valence value of the plurality of emotional valence values. Having the filtering affordances represent different associations provides improved user feedback that the emotional valence values can be filtered by association characteristics logged for the emotional valence values.

In some embodiments, method 900 further includes: while the first chart displays a set of one or more indications (e.g., 810-3, 810-5, 810-6, and 810-7) of respective one or more emotional valence values corresponding to (e.g., each corresponding to) the first association characteristic (e.g., the respective emotional valence value(s) the first association is for) in a first manner (e.g., the manner of display of indications 810-3, 810-5, 810-6, and 810-7 in FIG. 8E) (e.g., a default manner, where the display of indications of the respective emotional valence value(s) is not emphasized relative to indication(s) of other emotional valence value(s)), receiving, via the one or more input devices, a user input (e.g., 854) that selects the first filtering selectable graphical object (e.g., 846); and in response to receiving the user input that selects the first filtering selectable graphical object, changing the first chart to display the set of one or more indications in a second manner different from the first manner (e.g., the manner of display of indications 810-3, 810-5, 810-6, and 810-7 in FIG. 8F) (e.g., an emphasized manner, where the display of indication(s) of the respective emotional valence value(s) is emphasized (e.g., via a change in color and/or shape) relative to indication(s) of other emotional valence value(s)). In some embodiments, replace the display of the set of indications in the first manner with display of the set of indications in the second manner. In some embodiments, the system performs an analogous operation in response to receiving user input that selects the second filtering selectable graphical object. Filtering the emotional valence values by an association in response to the user input provides greater control of the system (e.g., the ability to filter by a selected association) without cluttering the user interface. Doing so also automatically performs an operation when a set of conditions have been met without requiring further user input.

In some embodiments, method 900 further includes: concurrently displaying, via the display generation component, the first chart with a selected processing view graphical object (e.g., 814) (e.g., an affordance, that when selected, causes display of information obtained by processing the plurality of emotional valence values); and while concurrently displaying the first chart with the selected processing view graphical object, displaying, via the display generation component, information (e.g., information in affordance 816 and/or affordance 818) obtained by processing (e.g., analyzing, summarizing, and/or organizing) the plurality of emotional valence values. In some embodiments, the information indicates a trend (e.g., trending higher or lower) for the plurality of emotional valence values over a time period, an average of the plurality of emotional valence values, and/or a range of the plurality of emotional valence values. In some embodiments, the information indicates a trend, an average, and/or a range for the momentary emotional valence values of the plurality of emotional valence values. In some embodiments, information indicates a trend, an average, and/or a range for the non-momentary emotional valence values of the plurality of emotional valence values (e.g., the emotional valence values logged for an entire time period or entire sub-time period). Concurrently displaying the first chart with the information obtained by processing the plurality of emotional valence values provides improved visual feedback about relevant health information. Doing so also reduces the number of user inputs otherwise required to access such information.

In some embodiments, method 900 further includes: while displaying the first chart, receiving, via the one or more input devices, a user input (e.g., 820) that selects the sub-time period (e.g., a user input that selects the user interface object (e.g., 812)); and in response to receiving the user input that selects the sub-time period, displaying, via the display generation component, a label (e.g., the labels in affordance 822) logged for an emotional valence value for the sub-time period (e.g., an emotional valence value logged for the entire sub-time period or an emotional valence value for a moment within the sub-time period). In some embodiments, displaying each label that was logged for each emotional valence value for the sub-time period. In some embodiments, displaying the label that was logged for the maximum emotional valence value for the sub-time period and/or displaying the label that was logged for the minimum emotional valence value for the sub-time period. Displaying the label provides improved visual feedback (e.g., additional detail) about the emotional valence value(s) logged for the sub-time period. Further, displaying the label in response to receiving the user input provides additional control of the system without cluttering the user interface.

In some embodiments, method 900 further includes: receiving, via the one or more user input devices, a first set of one or more user inputs that requests to log the first emotional valence value, and in response to receiving the first set of one or more user inputs, logging (e.g., storing) the first emotional valence value (e.g., as illustrated by the transition between FIG. 8F and FIG. 8G). Logging a momentary emotional valence value in response to receiving the first set of user inputs provides a more precise and less cumbersome input scheme for logging emotional valence data, which makes the user-system interface more efficient.

In some embodiments, method 900 further includes: receiving, via the one or more user input devices, a second set of one or more user inputs that requests to log the second emotional valence value, and in response to receiving the second set of one or more user inputs, logging (e.g., storing) the second emotional valence value. Logging an emotional valence value for an entire sub-time period in response to receiving the second set of user inputs provides a more precise and less cumbersome input scheme for logging emotional valence data, which makes the user-system interface more efficient.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve logging of and interaction with health data. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide the user with information regarding their mental well-being. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, collecting and/or processing of emotional valence data, the present technology can be configured to allow users to select to "opt in" or "opt out" of participation in the collection of personal information data during registration for services or anytime thereafter. In another example, users can select not to allow the computer system to access emotional valence data. In yet another example, users can select to limit the length of time for which the computer system can access emotional valence data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the device can provide information to the user based on non-personal information data or a bare minimum amount of personal information, such as the content being requested by the device associated with a user, other non-personal information available to the device, or publicly available information.

What is claimed is:

1. A computer system configured to communicate with a display generation component and one or more input devices, the computer system comprising:

one or more processors; and memory storing one or more programs configured to be executed by the one or more processors, the one or more programs including instructions for:

displaying, via the display generation component, a first user interface for logging emotional valence data, the first user interface including:

a shape having a first appearance representing a first emotional valence value; and first text describing a first range of emotional valence values, wherein the first range of emotional valence values includes the first emotional valence value;

while displaying the first user interface for logging emotional valence data, detecting, via the one or more input devices, a first user input that requests to change the first emotional valence value;

in response to detecting the first user input, updating the display of the first user interface, including:

changing the shape to have a second appearance different from the first appearance, wherein the second appearance represents a second emotional valence value different from the first emotional valence value;

in accordance with a determination that the second emotional valence value is within a second range of emotional valence values that does not overlap with the first range of emotional valence values, changing the first text to second text describing the second range of emotional valence values; and in accordance with a determination that the second emotional valence value is within the first range of emotional valence values, forgoing changing the first text based on the first user input; and displaying, via the display generation component, a first day graphical object representing a first day, wherein the first day graphical object includes a first set of one or more shapes having respective appearances that represent a respective emotional valence value logged for the first day, wherein:

in accordance with a determination that a first number of respective emotional valence values were logged for the first day, the first set of one or more shapes has the first number of shapes; and in accordance with a determination that a second number, different from the first number, of respective emotional valence values were logged for the first day, the first set of one or more shapes has the second number of shapes.

2. The computer system of claim 1, wherein the first user input corresponds to movement of a rotatable input mechanism.

3. The computer system of claim 1, wherein the first user input corresponds to movement of a slider selectable graphical object.

4. The computer system of claim 1, wherein the first user interface includes a next graphical object selectable to proceed to a next step in logging the emotional valence data, and wherein the one or more programs further include instructions for:

while displaying the first user interface, receiving, via the one or more input devices, a user input that selects the next graphical object; and in response to receiving the user input that selects the next graphical object, displaying, via the display generation component, a second user interface for logging the emotional valence data, wherein the second user interface includes:

the shape having a current appearance representing a current emotional valence value; and current text describing a respective range of emotional valence values.

5. The computer system of claim 4, wherein the second user interface further includes a time graphical object indicating a first time value associated with the current emotional valence value.

6. The computer system of claim 5, wherein the one or more programs further include instructions for:

receiving, via the one or more input devices, a first set of one or more inputs including a user input that selects the time graphical object; and in response to receiving the first set of one or more inputs, modifying the time graphical object to indicate a second time value different from the first time value.

7. The computer system of claim 5, wherein the first time value is a default time value that depends on when the user input that selects the next graphical object is received.

8. The computer system of claim 4, wherein the second user interface further includes:

a first association selectable graphical object that, when selected, associates a first association characteristic with the current emotional valence value; and a second association selectable graphical object that, when selected, associates a second association characteristic with the current emotional valence value, wherein the first and second association characteristics are different.

9. The computer system of claim 4, wherein the second user interface further includes:

a first label selectable graphical object that, when selected, associates a first label characteristic with the current emotional valence value; and a second label selectable graphical object that, when selected, associates a second label characteristic with the current emotional valence value, wherein the first and second label characteristics are different.

10. The computer system of claim 9, wherein the first and second label selectable graphical objects are displayed in an order that is based on the current emotional valence value.

11. The computer system of claim 4, wherein the second user interface further includes a graphical object selectable to allow entry of text describing the current emotional valence value.

12. The computer system of claim 4, wherein the second user interface further includes a logging graphical object, and wherein the one or more programs further include instructions for:

receiving, via the one or more input devices, a user input that selects the logging graphical object; and in response to receiving the user input that selects the logging graphical object, logging the current emotional valence value, including:

logging the current appearance of the shape; and logging the current text.

13. The computer system of claim 1, wherein the one or more programs further include instructions for:

while displaying the first day graphical object, receiving, via the one or more input devices, a user input corresponding to the first day graphical object; and in response to receiving the user input corresponding to the first day graphical object:

in accordance with a determination that the user input corresponding to the first day graphical object includes movement in a first direction, displaying, via the display generation component, a second day graphical object representing a second day before the first day, wherein the second day graphical object includes a second set of one or more shapes having respective appearances that represent a respective emotional valence value logged for the second day; and in accordance with a determination that the user input corresponding to the first day graphical object includes movement in a second direction different from the first direction, displaying, via the display generation component, a third day graphical object representing a third day after the first day, wherein the third day graphical object includes a third set of one or more shapes having respective appearances that represent a respective emotional valence value logged for the third day.

14. The computer system of claim 1, wherein the one or more programs further include instructions for:

while displaying the first day graphical object, receiving, via the one or more input devices, a user input that selects the first day graphical object; and in response to receiving the user input that selects the first day graphical object, displaying, via the display generation component, a detail user interface for the first day, wherein the detail user interface includes:

a second shape having an appearance representing an emotional valence value logged for a moment of the first day; and a third shape having an appearance representing an emotional valence value logged for the entire first day.

15. The computer system of claim 1, wherein the one or more programs further include instructions for:

displaying, via the display generation component, a calendar graphical object;

receiving, via the one or more input devices, a user input that selects the calendar graphical object; and in response to receiving the user input that selects the calendar graphical object, displaying, via the display generation component, a calendar that indicates, for a day of a month, a fourth set of one or more shapes having respective appearances that represent a respective emotional valence value logged for the day of the month.

16. The computer system of claim 1, wherein the one or more programs further include instructions for:

in accordance with a determination that a first set of one or more criteria is satisfied, wherein the first set of one or more criteria includes a first criterion that is satisfied when a current time is a first predetermined time:

displaying, via the display generation component, a first reminder to log emotional valence data.

17. The computer system of claim 16, wherein the one or more programs further include instructions for:

in accordance with a determination that a second set of one or more criteria is satisfied, wherein the second set of one or more criteria includes a second criterion that is satisfied when the current time is a second predetermined time different from the first predetermined time:

displaying, via the display generation component, a second reminder to log emotional valence data.

18. The computer system of claim 1, wherein the one or more programs further include instructions for:

displaying, via the display generation component, an information graphical object including information obtained by processing logged emotional valence data.

19. The computer system of claim 18, wherein the information graphical object is displayed in a predetermined section of a health application of the computer system.

20. The computer system of claim 18, wherein the information indicates a frequency with which a user has logged emotional valence data.

21. The computer system of claim 18, wherein the information indicates an association characteristic for a predetermined type of logged emotional valence value.

22. The computer system of claim 18, wherein the information indicates an aggregated value for emotional valence values logged during a predetermined time period.

23. A non-transitory computer-readable storage medium storing one or more programs configured to be executed by one or more processors of a computer system that is in communication with a display generation component and one or more input devices, the one or more programs including instructions for:

displaying, via the display generation component, a first user interface for logging emotional valence data, the first user interface including:

a shape having a first appearance representing a first emotional valence value; and first text describing a first range of emotional valence values, wherein the first range of emotional valence values includes the first emotional valence value;

while displaying the first user interface for logging emotional valence data, detecting, via the one or more input devices, a first user input that requests to change the first emotional valence value;

in response to detecting the first user input, updating the display of the first user interface, including:

changing the shape to have a second appearance different from the first appearance, wherein the second appearance represents a second emotional valence value different from the first emotional valence value;

in accordance with a determination that the second emotional valence value is within a second range of emotional valence values that does not overlap with the first range of emotional valence values, changing the first text to second text describing the second range of emotional valence values; and in accordance with a determination that the second emotional valence value is within the first range of emotional valence values, forgoing changing the first text based on the first user input; and displaying, via the display generation component, a first day graphical object representing a first day, wherein the first day graphical object includes a first set of one or more shapes having respective appearances that represent a respective emotional valence value logged for the first day, wherein:

in accordance with a determination that a first number of respective emotional valence values were logged for the first day, the first set of one or more shapes has the first number of shapes; and in accordance with a determination that a second number, different from the first number, of respective emotional valence values were logged for the first day, the first set of one or more shapes has the second number of shapes.

24. The non-transitory computer-readable storage medium of claim 23, wherein the first user input corresponds to movement of a rotatable input mechanism.

25. The non-transitory computer-readable storage medium of claim 23, wherein the first user input corresponds to movement of a slider selectable graphical object.

26. The non-transitory computer-readable storage medium of claim 23, wherein the first user interface includes a next graphical object selectable to proceed to a next step in logging the emotional valence data, and wherein the one or more programs further include instructions for:

while displaying the first user interface, receiving, via the one or more input devices, a user input that selects the next graphical object; and in response to receiving the user input that selects the next graphical object, displaying, via the display generation component, a second user interface for logging the emotional valence data, wherein the second user interface includes:

the shape having a current appearance representing a current emotional valence value; and current text describing a respective range of emotional valence values.

27. The non-transitory computer-readable storage medium of claim 23, wherein the one or more programs further include instructions for:

displaying, via the display generation component, a calendar graphical object;

receiving, via the one or more input devices, a user input that selects the calendar graphical object; and in response to receiving the user input that selects the calendar graphical object, displaying, via the display generation component, a calendar that indicates, for a day of a month, a fourth set of one or more shapes having respective appearances that represent a respective emotional valence value logged for the day of the month.

28. The non-transitory computer-readable storage medium of claim 23, wherein the one or more programs further include instructions for:

in accordance with a determination that a first set of one or more criteria is satisfied, wherein the first set of one or more criteria includes a first criterion that is satisfied when a current time is a first predetermined time:

displaying, via the display generation component, a first reminder to log emotional valence data.

29. The non-transitory computer-readable storage medium of claim 23, wherein the one or more programs further include instructions for:

displaying, via the display generation component, an information graphical object including information obtained by processing logged emotional valence data.

30. A method, comprising:

at a computer system that is in communication with a display generation component and one or more input devices:

displaying, via the display generation component, a first user interface for logging emotional valence data, the first user interface including:

a shape having a first appearance representing a first emotional valence value and first text describing a first range of emotional valence values, wherein the first range of emotional valence values includes the first emotional valence value;

while displaying the first user interface for logging emotional valence data, detecting via the one or more input devices, a first user input that requests to change the first emotional valence value;

in response to detecting the first user input, updating the display of the first user interface, including:

changing the shape to have a second appearance different from the first appearance, wherein the second appearance represents a second emotional valence value different from the first emotional valence value;

in accordance with a determination that the second emotional valence value is within a second range of emotional valence values that does not overlap with the first range of emotional valence values, changing the first text to second text describing the second range of emotional valence values; and in accordance with a determination that the second emotional valence value is within the first range of emotional valence values, forgoing changing the first text based on the first user input; and displaying, via the display generation component, a first day graphical object representing a first day, wherein the first day graphical object includes a first set of one or more shapes having respective appearances that represent a respective emotional valence value logged for the first day, wherein:

in accordance with a determination that a first number of respective emotional valence values were logged for the first day, the first set of one or more shapes has the first number of shapes; and in accordance with a determination that a second number, different from the first number, of respective emotional valence values were logged for the first day, the first set of one or more shapes has the second number of shapes.

31. The method of claim 30, wherein the first user input corresponds to movement of a rotatable input mechanism.

32. The method of claim 30, wherein the first user input corresponds to movement of a slider selectable graphical object.

33. The method of claim 30, wherein the first user interface includes a next graphical object selectable to proceed to a next step in logging the emotional valence data, the method further comprising:

while displaying the first user interface, receiving, via the one or more input devices, a user input that selects the next graphical object; and in response to receiving the user input that selects the next graphical object, displaying, via the display generation component, a second user interface for logging the emotional valence data, wherein the second user interface includes:

the shape having a current appearance representing a current emotional valence value; and current text describing a respective range of emotional valence values.

34. The method of claim 30, further comprising:

displaying, via the display generation component, a calendar graphical object;

receiving, via the one or more input devices, a user input that selects the calendar graphical object; and in response to receiving the user input that selects the calendar graphical object, displaying, via the display generation component, a calendar that indicates, for a day of a month, a fourth set of one or more shapes having respective appearances that represent a respective emotional valence value logged for the day of the month.

35. The method of claim 30, further comprising:

in accordance with a determination that a first set of one or more criteria is satisfied, wherein the first set of one or more criteria includes a first criterion that is satisfied when a current time is a first predetermined time:

displaying, via the display generation component, a first reminder to log emotional valence data.

36. The method of claim 30, further comprising:

displaying, via the display generation component, an information graphical object including information obtained by processing logged emotional valence data.

* * * * *